United States Patent
Tanino et al.

(10) Patent No.: US 12,480,020 B2
(45) Date of Patent: Nov. 25, 2025

(54) ANTIFOULING COATING COMPOSITION

(71) Applicant: CHUGOKU MARINE PAINTS, LTD., Otake (JP)

(72) Inventors: Soichiro Tanino, Otake (JP); Akino Nabe, Otake (JP); Yoshihiko Imai, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 597 days.

(21) Appl. No.: 17/906,125

(22) PCT Filed: Mar. 9, 2021

(86) PCT No.: PCT/JP2021/009227
§ 371 (c)(1),
(2) Date: Sep. 12, 2022

(87) PCT Pub. No.: WO2021/182454
PCT Pub. Date: Sep. 16, 2021

(65) Prior Publication Data
US 2023/0123769 A1    Apr. 20, 2023

(30) Foreign Application Priority Data

Mar. 13, 2020 (JP) ................. 2020-043955

(51) Int. Cl.
C09D 183/04 (2006.01)
C08K 3/22 (2006.01)

(52) U.S. Cl.
CPC ............. *C09D 183/04* (2013.01); *C08K 3/22* (2013.01); *C08K 2003/2296* (2013.01)

(58) Field of Classification Search
None
See application file for complete search history.

(56) References Cited

U.S. PATENT DOCUMENTS

| | | | |
|---|---|---|---|
| 11,098,205 | B2 | 8/2021 | Niimoto et al. |
| 11,499,069 | B2 | 11/2022 | Taniguchi et al. |
| 2020/0010697 | A1 | 1/2020 | Taniguchi et al. |
| 2020/0056055 | A1 | 2/2020 | Niimoto et al. |

FOREIGN PATENT DOCUMENTS

| | | | | |
|---|---|---|---|---|
| CN | 109734916 A | 5/2019 | | |
| EP | 2 204 423 A1 | 7/2010 | | |
| EP | 3 489 310 A1 | 5/2019 | | |
| EP | 3 489 311 A1 | 5/2019 | | |
| JP | 2006-77095 A | 3/2006 | | |
| JP | 2008-38113 A | 2/2008 | | |
| JP | 2013-129724 A | 7/2013 | | |
| JP | 2017-14490 A | 1/2017 | | |
| JP | 2019-199600 A | 11/2019 | | |
| SG | 159832 A1 | 4/2010 | | |
| WO | WO 2018/087846 A1 | 5/2018 | | |
| WO | WO-2018181429 A1 | * | 10/2018 | .......... C08F 290/046 |
| WO | WO-2018181668 A1 | * | 10/2018 | .............. C09D 7/20 |
| WO | WO 2018/221641 A1 | 12/2018 | | |
| WO | WO-2018221642 A1 | * | 12/2018 | .......... C09D 133/14 |
| WO | WO 2020/022431 A1 | 1/2020 | | |

OTHER PUBLICATIONS

WO 2018/224641 translation (Year: 2018).*
Combined Chinese Office Action and Search Report issued Feb. 3, 2023 in Patent Application No. 202180020203.5 (with English translation of Category of Cited Documents), 11 pages.
Extended European Search Report issued Feb. 14, 2024 in European Patent Application No. 21769012.2, 7 pages.
International Search Report and Written Opinion issued May 18, 2021 in PCT/JP2021/009227 (with unedited computer generated English Translation), 13 pages.

* cited by examiner

*Primary Examiner* — Katarzyna I Kolb
(74) *Attorney, Agent, or Firm* — Oblon, McClelland, Maier & Neustadt, L.L.P.

(57) ABSTRACT

An antifouling coating composition, an antifouling coating film, a substrate with an antifouling coating film or a method for producing the same, an antifouling method for a substrate, or a method for repairing a substrate with an antifouling coating film. The antifouling coating composition includes a hydrolyzable copolymer (A) containing an organosiloxane block and a metal ester group, and zinc oxide (B). The copolymer (A) contains 5 to 25% by mass of a constituent unit derived from a metal ester group-containing monomer, 5 to 15% by mass of a constituent unit derived from a monomer represented by formula (2), and a constituent unit derived from a monomer represented by formula (3).

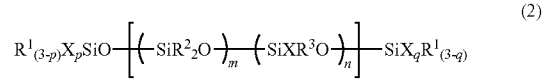

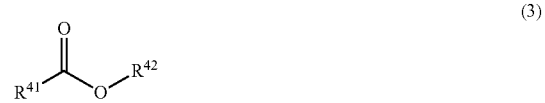

10 Claims, No Drawings

ANTIFOULING COATING COMPOSITION

CROSS REFERENCE TO RELATED APPLICATIONS

This application is a National Stage entry under 35 U.S.C. § 371 of PCT/JP2021/009227, filed on Mar. 9, 2021, and claims priority to Japanese Patent Application No. 2020-043955, filed on Mar. 13, 2020, the entire contents of which are incorporated herein by reference.

TECHNICAL FIELD

An embodiment of the present invention relates to an antifouling coating composition, an antifouling coating film, a substrate with an antifouling coating film or a method for producing the same, an antifouling method for a substrate, or a method for repairing a substrate with an antifouling coating film.

BACKGROUND ART

As a method for preventing the fouling of substrates for example of ships caused for example by aquatic organisms, a method of forming an antifouling coating film containing a hydrolyzable polymer on a substrate surface is broadly utilized. Such an antifouling coating film containing a hydrolyzable polymer exhibits antifouling properties in (sea)water, by a surface of the antifouling coating film being hydrophilized as the hydrolysis of the polymer progresses, and by the hydrophilized part being consumed for example by water flow (namely the antifouling coating film is renewed).

To improve the antifouling properties of an antifouling coating film, the adjustment of the hydrophilicity and water repellency of the hydrolyzable polymer is considered, and as an example of the adjustment, a method of introducing a silicone (polyorganosiloxane) component into the polymer is studied.

As an example of such an antifouling coating composition including a silicone component-containing polymer, Patent Literature 1, for example, discloses an antifouling coating composition including a polyorganosiloxane block-containing hydrolyzable copolymer and medetomidine.

CITATION LIST

Patent Literature

Patent Literature 1: WO 2018/087846 A1

SUMMARY OF INVENTION

Technical Problem

Conventional antifouling coating compositions which contain a silicone component-containing hydrolyzable polymer described for example in Patent Literature 1 have been found to exhibit a rapid consumption degree of an antifouling coating film obtained from the coating compositions. Antifouling coating films exhibiting such a rapid consumption degree have excellent antifouling properties, but the films must have a sufficient film thickness in order to exhibit antifouling properties sustained over a long period. On this point, there is room for improvement in such antifouling coating films.

In addition, antifouling coating films obtained from the conventional antifouling coating composition containing a silicone component-containing hydrolyzable polymer have also been found to have insufficient durability against damage to substrates for example of ships.

For example, a ship is generally landed (e.g., on a dock) for repair when the antifouling coating film applied onto a water (seawater)-contacting surface of the substrate thereof has reached the end of its lifetime. During the repair, the antifouling coating film is applied anew, and in addition to the antifouling coating film, films such as an anticorrosion coating film and an intermediate coating film usually formed under the antifouling coating film may also be damaged and such damaged films including anticorrosive and intermediate coating films are also repaired together. When films such as an anticorrosion coating film and an intermediate coating film are repaired, a coating material such as an anticorrosion coating material or an intermediate coating material is applied onto a substrate. During the work, the coating material may adhere onto the antifouling coating film after the end of the lifetime (old coating film) in many cases.

Due to inoperability of a ship, as well as the high cost in and of itself for dockage for example during the repair, there is a strong demand for shortening the repair period from an economic viewpoint. Thus, even though coating materials such as an anticorrosion coating material and an intermediate coating material are adhered onto an old coating film during the repair, coating films formed from the coating materials having sufficient adhesion onto the substrate have been desired.

As a result of the study by the present inventors, however, it has been found that an antifouling coating film formed from a conventional antifouling coating composition using a silicone component-containing hydrolyzable polymer has insufficient adhesion to a coating film such as an anticorrosion coating film or an intermediate coating film that may be formed on the antifouling coating film. Thus, in the repair, an antifouling coating film in the vicinity of a damaged coating film such as an anticorrosion coating film or an intermediate coating film must be conventionally removed for example, by a treatment such as a surface treatment. Accordingly, there is room for improvement in the time and economical aspects.

An embodiment of the present invention is providing an antifouling coating composition that can form an antifouling coating film having excellent damage resistance and an appropriate coating film consumption degree, with excellent adhesion to a coating film (hereinafter referred to as "repairability") such as an anticorrosion coating film or an intermediate coating film that may be formed on the antifouling coating film (including the deteriorated antifouling coating film).

Solution to Problem

As a result of earnest study, the present inventors found that the above problem can be resolved by embodiments below, and thus completed the present invention.

The embodiments of the present invention are as described below.

In the description below, the terms "(meth)acryloyl", "(meth)acrylate", "(meth)acrylic acid" and "(meth)acryl" mean "acryloyl and/or methacryloyl", "acrylate and/or methacrylate", "acrylic acid and/or methacrylic acid", and "acryl and/or methacryl", respectively.

<1> An antifouling coating composition including a hydrolyzable copolymer (A) containing an organosiloxane block and a metal ester group, and zinc oxide (B),
in which the copolymer (A) includes
5 to 25% by mass of a constituent unit derived from a metal ester group-containing monomer (a1),
5 to 15% by mass of a constituent unit derived from an organosiloxane block-containing monomer (a2) represented by the formula (2) below, and
a constituent unit derived from a monomer (a3) represented by the formula (3) below; and
the content of the zinc oxide (B) relative to 100 parts by mass of the content of the copolymer (A) is 70 to 200 parts by mass.

[Chem. 1]

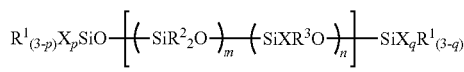

(2)

[wherein $R^1$, $R^2$, and $R^3$ each independently represent a monovalent hydrocarbon group, X each independently represent a (meth)acryloyloxyalkyl group or a mercaptoalkyl group, m is 1 or greater, n is 0 or greater, p and q are each independently 0 or 1, and n+p+q is 1 or greater],

[Chem. 2]

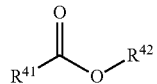

(3)

[wherein $R^{41}$ represents a monovalent group including an ethylenically unsaturated group, and $R^{42}$ represents a monovalent hydrocarbon group with 3 to 6 carbon atoms being free of an ethylenically unsaturated group].

<2> The antifouling coating composition described in <1>, in which the monomer (a1) includes at least one monomer selected from monomers (a11) represented by the formula (1-1) below and monomers (a12) represented by the formula (1-2) below.

[Chem. 3]

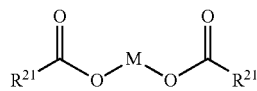

(1-1)

[wherein $R^{21}$ each independently represent a monovalent group including a terminal ethylenically unsaturated group, and M represents a metal atom],

[Chem. 4]

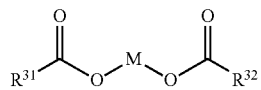

(1-2)

[wherein $R^{31}$ represents a monovalent group including a terminal ethylenically unsaturated group, and $R^{32}$ represents a monovalent group with 1 to 30 carbon atoms being free of a terminal ethylenically unsaturated group, and M represents a metal atom].

<3> The antifouling coating composition described in <1> or <2>, in which the monomer (a3) includes a monomer represented by the formula (3) in which $R^{42}$ is a butyl group.

<4> The antifouling coating composition described in any one of <1> to <3>, in which the copolymer (A) has a weight average molecular weight of 3,000 to 5,000.

<5> The antifouling coating composition described in any one of <1> to <4>, in which the acid value of a solvent-soluble content is 30 to 95 mgKOH/g.

<6> An antifouling coating film formed from the antifouling coating composition described in any one of <1> to <5>.

<7> A substrate with an antifouling coating film, having a substrate and the antifouling coating film described in <6>.

<8> A method for producing a substrate with an antifouling coating film, including a step in which the antifouling coating composition described in any one of <1> to <5> is provided on at least a part of a substrate and is subsequently dried.

<9> An antifouling method for a substrate, including a step in which the antifouling coating film described in <6> is formed on at least a part of a substrate.

<10> A method for repairing a substrate with an antifouling coating film, including a step wherein a repair coating material is applied onto the substrate with an antifouling coating film described in <7>.

Advantageous Effects of Invention

According to an embodiment of the present invention, an antifouling coating film having excellent damage resistance, an appropriate coating film consumption degree, and an excellent repairability can be formed. According to an embodiment of the present invention, a coating film having well-balanced excellent repairability and damage resistance, which has sufficient antifouling properties despite its appropriate coating film consumption degree, particularly having a coating film consumption degree which is slower than that of a conventional coating film, can be formed. Thus, according to an embodiment of the present invention, since an antifouling coating film excelling in damage resistance and having sufficient antifouling properties sustained over a long period can be formed, the period until the repair of the antifouling coating film can be elongated. Moreover, due to its excellent adhesion to other coating films, the antifouling coating film of an embodiment of the present invention makes it possible to reduce time and cost for repair compared with those conventionally required for repair, even if another coating film such as an anticorrosion coating film or an intermediate coating film is adhered onto the antifouling coating film (old coating film) during repair.

DESCRIPTION OF EMBODIMENTS

<<Antifouling Coating Composition>>

An antifouling coating composition according to an embodiment of the present invention (this may be hereinafter referred to as "the present composition") includes a hydrolyzable copolymer (A) containing an organosiloxane block and a metal ester group (this may be hereinafter referred to as "copolymer (A)"), and zinc oxide (B), in which the copolymer (A) includes
5 to 25% by mass of a constituent unit derived from a metal ester group-containing monomer (a1),
5 to 15% by mass of a constituent unit derived from an organosiloxane block-containing monomer (a2) represented by the formula (2) below, and
a constituent unit derived from a monomer (a3) represented by the formula (3) below; and
the content of the zinc oxide (B) relative to 100 parts by mass of the content of the copolymer (A) is 70 to 200 parts by mass.

Due to a specific copolymer (A) included therein and the content of the zinc oxide (B) being within the above range, the present composition can form an antifouling coating film having repairability and an appropriate coating film consumption degree in a well-balanced excellent manner.

<Copolymer (A)>

A copolymer (A) is a hydrolyzable copolymer containing an organosiloxane block and a metal ester group, and includes
5 to 25% by mass of a constituent unit derived from a metal ester group-containing monomer (a1),
5 to 15% by mass of a constituent unit derived from an organosiloxane block-containing monomer (a2) represented by the formula (2) below, and
a constituent unit derived from a monomer (a3) represented by the formula (3) below.

By using the copolymer (A) having the above specific constitution, an antifouling coating film having repairability and an appropriate coating film consumption degree in a well-balanced excellent manner can be obtained.

The present composition may include 1 or more copolymers (A).

In the present invention, "a copolymer having a constituent unit derived from A" means a copolymer into which A has been introduced via a polymerization reaction or chain transfer. Accordingly, when the monomer (a2) has a mercapto group for example, H is removed from —SH to form —S. (S radicals), which are polymerized to form a copolymer. In this case also, the copolymer (A) is regarded as having a constituent unit derived from a monomer (a2).

It is preferred that the number average molecular weight (Mn) and weight average molecular weight (Mw) of the copolymer (A) are appropriately adjusted in consideration of, for example, the viscosity and storage stability of an antifouling coating composition to be obtained and the properties such as a coating film consumption degree (elution rate, renewability) of an antifouling coating film to be obtained.

In the aspects, for example, that an antifouling coating composition having low viscosity and excellent storage stability can be easily obtained, that an antifouling coating film having an appropriate coating film consumption degree can be easily obtained, and that an antifouling coating film having excellent repairability can be easily obtained, the Mn of the copolymer (A) is preferably 1,000 or greater, and more preferably 1,500 or greater, and is preferably 5,000 or less, and more preferably 3,000 or less. For the same reasons, the Mw of the copolymer (A) is preferably 2,000 or greater, and more preferably 3,000 or greater, and is preferably 10,000 or less, more preferably 6,000 or less, and particularly preferably 5,000 or less.

The above Mn and Mw are obtained by measurement by gel permeation chromatography, and conversion in terms of standard polystyrene, specifically by the method described in Examples described later.

In the aspects, for example, that an antifouling coating composition having excellent coating workability can be easily obtained and that an antifouling coating film having sufficient antifouling properties can be easily obtained, the content of the copolymer (A) in the present composition is preferably 10% by mass or greater, and more preferably 15% by mass or greater, and is preferably 50% by mass or less, more preferably 40% by mass or less, and still more preferably 30% by mass or less. Relative to 100% by mass of solids included in the present composition, the content of the copolymer (A) is preferably 15% by mass or greater, and more preferably 20% by mass or greater, and is preferably 50% by mass or less, and more preferably 40% by mass or less.

When the present composition includes 2 or more types of the copolymers (A), the above content means a preferred range of the total content of the 2 or more types of the copolymers (A). The same also applies to each of the components described below.

[Constituent Unit Derived from Metal Ester Group-Containing Monomer (a1)]

The copolymer (A) includes a constituent unit derived from a metal ester group-containing monomer (a1) (this may be hereinafter referred to as "constituent unit (i)"). The copolymer (A) may include 1 or more types of constituent units (i).

In the aspects, for example, that an antifouling coating film having sufficient antifouling properties can be easily obtained and further that the present composition having excellent coating workability can be easily obtained, the content of the constituent unit (i) in the copolymer (A) relative to 100% by mass of the total constituent units included in the copolymer (A), is 5% by mass or greater, preferably 7% by mass or greater, and more preferably 9% by mass or greater, and is 25% by mass or less, preferably 20% by mass or less, and more preferably 17% by mass or less.

In the present invention, the total constituent units of the copolymer (A) do not include constituent units derived from a polymerization initiator and a chain transfer agent.

The content of each constituent unit in the copolymer (A) can be measured by a method such as nuclear magnetic resonance spectroscopy (NMR) or gas chromatography-mass spectrometry (GC-MS), and can also be calculated from the use amount of each of monomers that are used in the synthesis of the copolymer (A).

In the aspect that an antifouling coating film having sufficient antifouling properties and excellent water resistance can be easily obtained for example, the monomer (a1) preferably contains at least one monomer selected from monomers (a11) represented by the formula (1-1) below and monomers (a12) represented by the formula (1-2) below, more preferably contains a monomer (a11), and still more preferably contains 50% by mass or greater of a monomer (a11).

[Chem. 5]

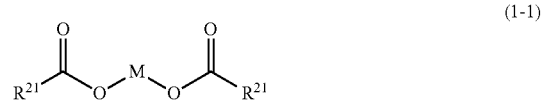

(1-1)

[wherein $R^{21}$ each independently represent a monovalent group including a terminal ethylenically unsaturated group, and M represents a metal atom.]

A metal atom as M is a bivalent metal atom, and example thereof include a magnesium atom, a calcium atom, a neodymium atom, a titanium atom, a zirconium atom, an iron atom, a ruthenium atom, a cobalt atom, a nickel atom, a copper atom, a zinc atom, and an aluminum atom. Among the above, metal atoms of elements of the 10th to 12th groups such as nickel, copper, and zinc atoms are preferred, copper and zinc atoms are more preferred, and a zinc atom is still more preferred.

$R^{21}$ is a monovalent group including a terminal ethylenically unsaturated group ($CH_2$=C<), and has preferably 2 to 50, more preferably 2 to 30, still more preferably 2 to 10, and particularly preferably 2 to 6 carbon atoms.

It is enough for $R^{21}$ to have a terminal ethylenically unsaturated group, and $R^{21}$ may also have an ethylenically unsaturated group in a position other than a terminal position. However, it is more preferred that $R^{21}$ has an ethylenically unsaturated group at a terminal alone.

$R^{21}$ is preferably an unsaturated organic group having a terminal ethylenically unsaturated group. Examples of the unsaturated organic group include an unsaturated aliphatic hydrocarbon group and the unsaturated aliphatic hydrocarbon group a part of which is substituted with an ester bond, an amide bond, or an ether bond.

Specific examples of $R^{21}$ are a group in which a carboxy group is removed from an aliphatic unsaturated monocarboxylic acid having a terminal ethylenically unsaturated group such as acrylic acid (2-propenoic acid), methacrylic acid (2-methyl-2-propenoic acid), 3-butenoic acid, 4-pentenoic acid, 10-undecenoic acid, or a (meth)acryloyloxyalkylcarboxylic acid [e.g., 3-(meth)acryloyloxypropionic acid or 3-(meth)acryloyloxy-2-methylpropionic acid]; and a group in which one carboxy group is removed from an aliphatic unsaturated dicarboxylic acid having a terminal ethylenically unsaturated group such as itaconic acid.

Among the above examples, $R^{21}$ is preferably a group in which a carboxy group is removed from an aliphatic unsaturated monocarboxylic acid having a terminal ethylenically unsaturated group, more preferably a group in which a carboxy group is removed from acrylic acid, methacrylic acid, or (meth)acryloyloxyalkylcarboxylic acid, and still more preferably a group in which a carboxy group is removed from acrylic acid or methacrylic acid.

The monomer (a11) is preferably a monomer (a11') represented by the formula (1-1') below.

[Chem. 6]

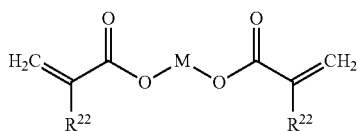

(1-1')

[wherein $R^{22}$ each independently represent a hydrogen atom or a methyl group, and M represents a copper atom or a zinc atom.]

Examples of the monomer (a11) include zinc diacrylate, zinc dimethacrylate, zinc acrylate methacrylate, zinc di(3-acryloyloxypropionate), zinc di(3-methacryloyloxypropionate), zinc di(3-(meth)acryloyloxy-2-methylpropionate), copper diacrylate, copper dimethacrylate, copper acrylate methacrylate, copper di(3-acryloyloxypropionate), copper di(3-methacryloyloxypropionate), and copper di(3-(meth)acryloyloxy-2-methylpropionate). Among the examples, zinc diacrylate, zinc dimethacrylate, or zinc acrylate methacrylate is preferably included in the aspect that an antifouling coating film having sufficient antifouling properties can be easily obtained for example.

[Chem. 7]

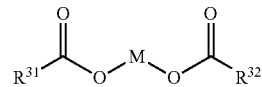

(1-2)

[wherein $R^{31}$ represents a monovalent group including a terminal ethylenically unsaturated group, and $R^{32}$ represents a monovalent group with 1 to 30 carbon atoms being free of a terminal ethylenically unsaturated group, and M represents a metal atom.]

In the formula (1-2), $R^{31}$ and M are exemplified by the same groups (atoms) described as the examples of $R^{21}$ and M in the formula (1-1). The same also applies to the preferred groups (atoms).

Examples of $R^{32}$ include organic groups being free of a terminal ethylenically unsaturated group such as an aliphatic hydrocarbon group having 1 to 30 carbon atoms, an alicyclic hydrocarbon group having 3 to 30 carbon atoms, and an aromatic hydrocarbon group having 6 to 30 carbon atoms. The above groups may have a substituent such as a hydroxy group.

The aliphatic hydrocarbon group may be linear or branched, and may be a saturated aliphatic hydrocarbon group or an unsaturated aliphatic hydrocarbon group. When $R^{32}$ is an unsaturated aliphatic hydrocarbon group, $R^{32}$ has no terminal ethylenically unsaturated group. The carbon number of the aliphatic hydrocarbon group is from 1 to 30, preferably from 1 to 28, more preferably from 1 to 26, and still more preferably from 1 to 24. The aliphatic hydrocarbon group may be substituted with an alicyclic hydrocarbon group or an aromatic hydrocarbon group.

The alicyclic hydrocarbon group may be a saturated alicyclic hydrocarbon group or an unsaturated alicyclic hydrocarbon group. The carbon number of the alicyclic hydrocarbon group is 3 or greater, preferably 4 or greater, more preferably 5 or greater, and still more preferably 6 or greater, and is 30 or less, preferably 20 or less, more preferably 16 or less, and still more preferably 12 or less.

The alicyclic hydrocarbon group may be substituted with an aliphatic hydrocarbon group or an aromatic hydrocarbon group.

The carbon number of the aromatic hydrocarbon group is from 6 to 30, preferably from 6 to 24, more preferably from 6 to 18, and still more preferably from 6 to 10. The aromatic hydrocarbon group may be substituted with an aliphatic hydrocarbon group or an alicyclic hydrocarbon group.

$R^{32}$ is preferably an organic acid residue derived from a monobasic acid, and a specific example thereof includes a group obtained by removing a carboxy group from an organic acid selected from the group consisting of versatic acid, palmitic acid, stearic acid, isostearic acid, oleic acid, linoleic acid, linolenic acid, abietic acid, neoabietic acid, pimaric acid, dehydroabietic acid, 12-hydroxystearic acid, and naphthenic acid. Among the above, a group obtained by removing a carboxy group from abietic acid, versatic acid, or naphthenic acid is preferred, and a group obtained by removing a carboxy group from abietic acid or versatic acid is more preferred.

The monomer (a12) is preferably a monomer (a12') represented by the formula (1-2') below.

[Chem. 8]

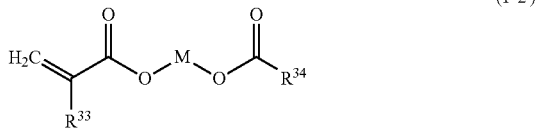

(1-2')

[wherein $R^{33}$ represents a hydrogen atom or a methyl group, $R^{34}$ represents the same as $R^{32}$ in the formula (1-2), and M represents a copper atom or a zinc atom.]

Examples of the monomer (a12) include zinc 3-(meth)acryloyloxypropionate rosinate, zinc 3-(meth)acryloyloxypropionate versatate, zinc (meth)acrylate rosinate, zinc (meth)acrylate versatate, zinc (meth)acrylate naphthenate, copper 3-(meth)acryloyloxypropionate rosinate, copper 3-(meth)acryloyloxypropionate versatate, copper (meth)acrylate rosinate, copper (meth)acrylate versatate, and copper (meth)acrylate naphthenate.

When the copolymer (A) has a constituent unit derived from the monomer (a12), the constituent unit is preferably a constituent unit obtained by polymerizing terminal ethylenically unsaturated groups alone in the monomers (a12).

[Constituent Unit Derived from Organosiloxane Block-Containing Monomer (a2)]

The copolymer (A) has a constituent unit derived from an organosiloxane block-containing monomer (a2) represented by the formula (2) (this may be hereinafter referred to as "constituent unit (ii)") below. The copolymer (A) may include 1 or more constituent units (ii).

Due to the constituent unit (ii) included in the copolymer (A), an antifouling coating film having improved antifouling properties particularly such as slime resistance can be easily obtained.

In the aspect that an antifouling coating film having sufficient antifouling properties and excellent repairability can be easily obtained for example, the content of the constituent unit (ii) in the copolymer (A) relative to 100% by mass of the total constituent units included in the copolymer (A), is 5% by mass or greater, and preferably 8% by mass or greater, and is 15% by mass or less, and preferably 12% by mass or less.

[Chem. 9]

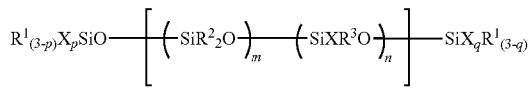

(2)

[wherein $R^1$, $R^2$, and $R^3$ each independently represent a monovalent hydrocarbon group, X each independently represent a (meth)acryloyloxyalkyl group or a mercaptoalkyl group, m is 1 or greater, n is 0 or greater, p and q are each independently 0 or 1, and n+p+q is 1 or greater.]

Examples of hydrocarbon groups as $R^1$, $R^2$, and $R^3$ include linear, branched, or cyclic alkyl and aryl groups.

The carbon number of the alkyl group is preferably from 1 to 12, more preferably from 1 to 8, and still more preferably from 1 to 4.

The carbon number of the aryl group is preferably from 6 to 14, and more preferably from 6 to 10.

From the viewpoint of the ease of polymerization, $R^1$, $R^2$, and $R^3$ are preferably each independently an alkyl group such as a methyl group or a butyl group.

From the viewpoint of uniform polymerization, X is preferably a (meth)acryloyloxyalkyl group, and from the viewpoint of easy handling achieved by the reduced viscosity of the copolymer (A), a mercaptoalkyl group is preferred.

Examples of X include a (meth)acryloyloxyethyl group, a (meth)acryloyloxypropyl group, a (meth)acryloyloxybutyl group, a mercaptomethyl group, a mercaptoethyl group, a mercaptopropyl group, and a mercaptobutyl group.

In the formula (2), m and n mean an average number of moles added for ($SiR^2_2O$) and ($SiXR^3O$), respectively.

In the formula (2), m+n is preferably 2 or greater. In other words, the organosiloxane block-containing monomer (a2) is preferably a polyorganosiloxane block-containing monomer (a2).

In the present specification, the description of 2 or more different repeating units juxtaposed in [ ] means that the repeating units may be repeated in any order, namely in random, alternate, or blockwise order. In other words, for example in the case of a formula $—[Y_3—Z_3]—$ (in which Y and Z each mean a repeating unit), the order intended by the description may be a random order such as —YYZYZZ—, an alternate order such as —YZYZYZ—, or a blockwise order such as —YYYZZZ— or —ZZZYYY—.

An embodiment of the copolymer (A) preferably includes a constituent unit derived from a monomer (a21) represented by the formula (2) in which n is 0, p is 1, and q is 0.

An antifouling coating composition including the copolymer (A) having a constituent unit derived from the above monomer (a21) is preferred in the aspect that an antifouling coating film having more excellent antifouling properties can be formed.

From the viewpoint of the ease of polymerization for example, m in the monomer (a21) is preferably 3 or greater, and more preferably 5 or greater, and is preferably 200 or less, and more preferably 70 or less.

As the monomer (a21), commercially available products may be used. Examples of the commercially available products include FM-0711 (one terminal methacryloyloxyalkyl-modified organopolysiloxane, number average molecular weight: 1,000), FM-0721 (one terminal methacryloyloxyalkyl-modified organopolysiloxane, number average molecular weight: 5,000), and FM-0725 (one terminal methacryloyloxyalkyl-modified organopolysiloxane, number average molecular weight: 10,000) produced by JNC Corporation; and X-22-174ASX (one terminal methacryloyloxyalkyl-modified organopolysiloxane, functional group equivalent: 900 g/mol), KF-2012 (one terminal methacryloyloxyalkyl-modified organopolysiloxane, functional group equivalent: 4,600 g/mol), and X-22-2426 (one terminal methacryloyloxyalkyl-modified organopolysiloxane, functional group equivalent: 12,000 g/mol) produced by Shin-Etsu Chemical Co., Ltd.

Another embodiment of the copolymer (A) preferably includes a constituent unit derived from a monomer (a22) represented by the formula (2) in which n is 0, and p and q are each 1.

An antifouling coating composition including the copolymer (A) having a constituent unit derived from such a monomer (a22) is preferred since it tends to easily form an antifouling coating film having excellent repairability.

From the viewpoint of the ease of polymerization for example, m in the monomer (a22) is preferably 3 or greater, and more preferably 5 or greater, and is preferably 200 or less, and more preferably 70 or less.

As the monomer (a22), commercially available products may be used. Examples of the commercially available products include FM-7711 (both terminals methacryloyloxyalkyl-modified organopolysiloxane, number average molecular weight: 1,000), FM-7721 (both terminals methacryloyloxyalkyl-modified organopolysiloxane, number average molecular weight: 5,000), and FM-7725 (both terminals methacryloyloxyalkyl-modified organopolysiloxane, number average molecular weight: 10,000) produced by JNC Corporation; and X-22-164 (both terminals methacryloyloxyalkyl-modified organopolysiloxane, functional group equivalent: 190 g/mol), X-22-164AS (both terminals methacryloyloxyalkyl-modified organopolysiloxane, functional group equivalent: 450 g/mol), X-22-164A (both terminals methacryloyloxyalkyl-modified organopolysiloxane, functional group equivalent: 860 g/mol), X-22-164B (both terminals methacryloyloxyalkyl-modified organopolysiloxane, functional group equivalent: 1,630 g/mol), X-22-164C (both terminals methacryloyloxyalkyl-modified organopolysiloxane, functional group equivalent: 2,370 g/mol), X-22-164E (both terminals methacryloyloxyalkyl-modified organopolysiloxane, functional group equivalent: 3,900 g/mol), and X-22-167B (both terminals mercaptoalkyl-modified organopolysiloxane, functional group equivalent: 1,670 g/mol) produced by Shin-Etsu Chemical Co., Ltd.

Further, another embodiment of the copolymer (A) preferably includes a constituent unit derived from a monomer (a23) represented by the formula (2) in which n is 1 or greater.

The copolymer (A) having such a constituent unit derived from a monomer (a23) is preferred in terms of low viscosity and easy handling.

In such a monomer (a23), m is preferably from 50 to 1,000, and n is preferably from 1 to 30.

As the monomer (a23), commercially available products may be used. Examples of the commercially available products are KF-2001 (side chain mercaptoalkyl-modified organopolysiloxane, functional group equivalent: 1,900 g/mol), and KF-2004 (side chain mercaptoalkyl-modified organopolysiloxane, functional group equivalent: 30,000 g/mol) produced by Shin-Etsu Chemical Co., Ltd.

[Constituent Unit Derived from Monomer (a3)]

The copolymer (A) includes a constituent unit derived from a monomer (a3) represented by the formula (3) (this may be hereinafter referred to as "constituent unit (iii)") below. The copolymer (A) may include 1 or more types of the constituent units (iii).

Due to the copolymer (A) including the constituent unit (iii), an antifouling coating film having excellent repairability can be easily obtained and the coating film consumption degree can be suppressed to an appropriate renewal rate without serious loss of the antifouling properties of an obtained antifouling coating film. Thus, an antifouling coating film having sufficient antifouling properties sustained over a long period can be easily obtained.

In the aspect that an antifouling coating film having sufficient antifouling properties and excellent repairability can be easily obtained for example, the content of the constituent unit (iii) in the copolymer (A) relative to 100% by mass of the total constituent units included in the copolymer (A) is preferably 3% by mass or greater, and more preferably 5% by mass or greater, and is preferably 40% by mass or less, more preferably 30% by mass or less, and particularly preferably 25% by mass or less.

[Chem. 10]

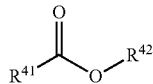

(3)

[wherein $R^{41}$ represents a monovalent group including an ethylenically unsaturated group, and $R^{42}$ represents a monovalent hydrocarbon group with 3 to 6 carbon atoms being free of an ethylenically unsaturated group].

Specific examples of the monomer (a3) include n-propyl(meth)acrylate, isopropyl(meth)acrylate, n-butyl(meth)acrylate, isobutyl(meth)acrylate, tert-butyl(meth)acrylate, pentyl(meth)acrylate, hexyl(meth)acrylate, cyclohexyl(meth)acrylate, and phenyl(meth)acrylate.

The monomer (a3) preferably includes a monomer in which $R^{42}$ is an aliphatic hydrocarbon group, preferably a monomer in which $R^{42}$ is a butyl group, specifically n-butyl(meth)acrylate, isobutyl(meth)acrylate, or tert-butyl(meth)acrylate, more preferably n-butyl(meth)acrylate, and particularly preferably n-butylacrylate. Using such monomers (a3), the present composition having a low coating material viscosity and excellent coating workability can be easily obtained, and an antifouling coating film which can suppress the coating film consumption degree to an appropriate renewal rate without serious loss of antifouling properties, and which excels in damage resistance can be easily obtained.

When the monomer (a3) includes a monomer in which $R^{42}$ is a butyl group, the content thereof relative to 100 parts by mass of the monomer (a3) is preferably 10 parts by mass or greater, and more preferably 20 parts by mass or greater.

The monomer (a3) also preferably includes cyclohexyl(meth)acrylate and more preferably cyclohexyl methacrylate. Using such a monomer (a3), an antifouling coating film having particularly good antifouling properties while exhibiting a low coating film consumption degree can be easily obtained, and the present composition having a particularly low coating material viscosity and excellent coating workability can be easily obtained.

When the monomer (a3) includes 2 or more monomers, the monomer (a3) preferably includes a monomer in which $R^{42}$ is a butyl group and cyclohexyl(meth)acrylate. Using such monomers, a low coating material viscosity and excellent coating workability, an antifouling coating film having sufficient antifouling properties despite the low coating film consumption degree thereof compared with those of conventional coating films, and excelling in damage resistance can be easily obtained.

When a monomer in which $R^{42}$ is a hydrocarbon group having less than 3 carbon atoms is used instead of the monomer (a3), an antifouling coating film having an appropriate coating film consumption degree and excellent damage resistance cannot be obtained. When a monomer in which $R^{42}$ is an organic group having greater than 6 carbon atoms is used instead of the monomer (a3), an antifouling coating film having excellent antifouling properties cannot be obtained. These reasons for the above are not accurately clarified, but it is supposed that $R^{42}$ can mitigate the tendency to cause a discontinuous and ununiform state due to polar or nonpolar groups present in a formed antifouling coating film.

[Constituent Unit Derived from Other Monomer (a4)]

The copolymer (A) may optionally include a constituent unit derived from a monomer (a4) (this may be hereinafter referred to as "constituent unit (iv)") other than the monomers (a1) to (a3), and preferably includes the constituent unit (iv). The copolymer (A) may include 1 or more types of the constituent units (iv).

When the copolymer (A) includes the constituent unit (iv), the content of the constituent unit (iv) in the copolymer (A) relative to 100% by mass of the total constituent units included in the copolymer (A) is preferably 50% by mass or greater, and more preferably 53% by mass or greater, and is preferably 80% by mass or less, and more preferably 75% by mass or less in the aspect that an antifouling coating film having sufficient antifouling properties and excellent repairability can be easily obtained for example.

As the monomer (a4), monomers being polymerizable with the monomers (a1) to (a3) may be used without restriction, but the monomer (a4) is preferably an ethylenically unsaturated compound, more preferably (meth)acrylate.

The monomer (a4) preferably includes a monomer (a41) represented by the formula (3) in which $R^{42}$ is a hydrocarbon group having 1 or 2 carbon atoms, or a monomer (a42) represented by the formula (3) in which $R^{42}$ is an organic group with an ether bond, having 2 to 20 carbon atoms. The monomer (a4) more preferably includes the monomer (a41).

Due to the copolymer (A) having such a constituent unit derived from the monomer (a41) or (a42), an antifouling coating film having excellent damage resistance and crack resistance while having good antifouling properties can be easily obtained, and the viscosity of the present composition is easily adjusted to a viscosity in which excellent coating workability is exhibited.

Specific examples of the monomer (a41) include methyl (meth)acrylate, and ethyl(meth)acrylate, and methylmethacrylate or ethylacrylate is preferred in the aspect that an antifouling coating film having excellent antifouling properties, damage resistance and crack resistance can be easily obtained, as well as in terms of easy availability or safety of the monomers and ease of polymerization of a polymer.

When the copolymer (A) includes a constituent unit derived from the monomer (a41), the copolymer (A) preferably includes constituent units derived from 2 or more types of the monomers (a41). In the aspect, for example, that an antifouling coating film having excellent damage resistance and crack resistance can be easily obtained, as well as in terms of ease of polymerization of a polymer, the copolymer (A) preferably includes constituent units derived from methylmethacrylate and ethylacrylate. In this case, the content of the constituent unit derived from ethylacrylate relative to 100 parts by mass of the constituent unit derived from methylmethacrylate is preferably 50 parts by mass or greater, and more preferably 70 parts by mass or greater, and is preferably 300 parts by mass or less, and more preferably 200 parts by mass or less.

When the copolymer (A) includes a constituent unit derived from the monomer (a41), the content of the constituent unit derived from the monomer (a41) relative to 100 parts by mass of the content of the constituent unit (iii) included in the copolymer (A) is preferably 200 parts by mass or greater, and more preferably 250 parts by mass or greater, and is preferably 1,000 parts by mass or less.

When the copolymer (A) includes a constituent unit derived from the monomer (a41) and the constituent unit (iii) in the copolymer (A) includes a constituent unit derived from an acrylate, the content of the constituent unit derived from a methacrylate in the monomer (a41) relative to 100 parts by mass of the constituent unit derived from an acrylate in the constituent unit (iii) is preferably 50 parts by mass or greater, more preferably 100 parts by mass or greater, and still more preferably 150 parts by mass or greater, and is preferably 700 parts by mass or less, more preferably 500 parts by mass or less, and still more preferably 400 parts by mass or less, in the aspect that an antifouling coating film having excellent antifouling properties, damage resistance and crack resistance can be easily obtained for example.

When the copolymer (A) includes a constituent unit derived from the monomer (a41), the content thereof relative to 100% by mass of the total constituent units included in the copolymer (A) is preferably 45% by mass or greater, more preferably 50% by mass or greater, and still more preferably 53% by mass or greater, and is preferably 80% by mass or less, more preferably 75% by mass or less, and still more preferably 70% by mass or less, in the aspect that an antifouling coating film having excellent antifouling properties and damage resistance can be easily obtained for example.

Specific examples of the monomers (a42) include alkoxy group or aryloxy group-containing (meth)acrylates such as 2-methoxyethyl (meth)acrylate, 2-ethoxyethyl (meth)acrylate, 4-methoxybutyl (meth)acrylate, 3-methoxy-n-propyl (meth)acrylate, 2-propoxyethyl (meth)acrylate, 2-butoxyethyl (meth)acrylate, isobutoxybutyldiglycol (meth)acrylate, 2-phenoxyethyl (meth)acrylate, methoxypolyethylene glycol (meth)acrylate, ethoxypolyethylene glycol (meth)acrylate, butoxypolyethylene glycol (meth)acrylate, and phenoxypolyethylene glycol (meth)acrylate; and glycidyl group-containing (meth)acrylates such as glycidyl (meth)acrylate. Among the above, 2-methoxyethyl (meth)acrylate, and 2-ethoxyethyl (meth)acrylate are preferred, 2-methoxyethyl (meth)acrylate is more preferred, and 2-methoxyethyl acrylate is still more preferred, in the aspect that a coating film having particularly excellent antifouling properties can be easily obtained for example.

When the copolymer (A) includes a constituent unit derived from the monomer (a42), the content thereof relative to 100% by mass of the total constituent units included in the copolymer (A) is preferably 1% by mass or greater, and more preferably 3% by mass or greater, and is preferably 20% by mass or less, and more preferably 12% by mass or less.

Specific examples of the monomers (a4) other than the monomers (a41) and (a42) include alkyl (meth)acrylates or aryl (meth)acrylates such as n-octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, and benzyl (meth)acrylate;

hydroxy group-containing (meth)acrylates such as hydroxymethyl (meth)acrylate, 2-hydroxyethyl (meth)acrylate, 2-hydroxypropyl (meth)acrylate, 4-hydroxybutyl (meth)acrylate, and 2-hydroxy-3-phenoxypropyl (meth)acrylate;

silyl group-containing (meth)acrylates such as tri(isopropyl) silyl(meth)acrylate; and vinyl compounds such as styrene, α-methylstyrene, vinyl acetate, vinyl benzoate, vinyltoluene, acrylonitrile, vinylpyridine, vinylpyrrolidone, and vinyl chloride.

[Method for Synthesizing Copolymer (A)]

The copolymer (A) can be synthesized for example by the following method.

When the monomer (a11) or (a12) is used as the monomer (a1), the monomer (a11) or (a12) is first synthesized.

The method for synthesizing the monomer (a11) or (a12) is exemplified by a publicly-known method in which an inorganic metal compound (preferably such as an oxide, a hydroxide, or a chloride of copper or zinc) and an organic acid such as methacrylic acid or acrylic acid, or an esterified product thereof are heated and stirred in the presence of an organic solvent and water at a temperature not higher than the decomposition temperature of the inorganic metal compound. More specifically, a liquid mixture obtained by mixing an organic solvent with an inorganic metal compound such as zinc oxide is heated to approximately 50 to 80° C. under stirring conditions, a liquid mixture including, for example, an organic acid such as methacrylic acid or acrylic acid or an esterified product thereof, and water is added dropwise thereto, and the mixture is further stirred.

Next, a solvent is fed into a newly-prepared reactor, and is heated approximately to 80 to 120° C., and a liquid mixture containing, for example, the monomers (a1) to (a3), optionally the monomer (a4), a polymerization initiator, a chain transfer agent, and a solvent is added dropwise to the reactor to carry out a polymerization reaction. Thereby the copolymer (A) can be synthesized.

Polymerization initiators that may be used in the synthesis of the copolymer (A) are not particularly limited and various types of radical polymerization initiators may be used for example. Specific examples include benzoyl peroxide, hydrogen peroxide, cumene hydroperoxide, tert-butyl hydroperoxide, potassium persulfate, sodium persulfate, 2,2'-azobis(isobutyronitrile) [AIBN], 2,2'-azobis(2-methylbutyronitrile) [AMEN], 2,2'-azobis(2,4-dimethylvaleronitrile) [ADVN], and tert-butyl peroxyoctoate [TBPO]. These polymerization initiators may be used alone or 2 or more types thereof. These polymerization initiators may be added to the reaction system exclusively at the start of the reaction, or may be added to the reaction system both at the start of the reaction and in the course of the reaction.

The amount of the polymerization initiator used relative to 100 parts by mass of the monomers (a1) to (a4) in total is preferably 2 parts by mass or greater, and more preferably 9 parts by mass or greater, and is preferably 20 parts by mass or less, and more preferably 18 parts by mass or less in the aspect that an antifouling coating film having good antifouling properties and excellent repairability can be easily obtained for example. When the polymerization initiator includes TBPO, the amount of TBPO used relative to 100 parts by mass of the monomers (a1) to (a4) in total is preferably 1 to 5 parts by mass.

Chain transfer agents that may be used in the synthesis of the copolymer (A) are not particularly limited and examples thereof include α-methylstyrene dimer, thioglycolic acid, diterpene, terpinolene, γ-terpinene; mercaptans such as tert-dodecylmercaptan and n-dodecylmercaptan; halides such as carbon tetrachloride, methylene chloride, bromoform, and bromotrichloroethane; and secondary alcohols such as isopropanol and glycerin. These chain transfer agents may be used alone or 2 or more types thereof.

When a chain transfer agent is used, the amount of the chain transfer agent used relative to 100 parts by mass of the monomers (a1) to (a4) in total is preferably from 0.1 to 5 parts by mass.

Examples of solvents that can be used in the synthesis of the copolymer (A) include aromatic solvents such as toluene, xylene, and mesitylene; alcohols such as propanol, butanol, propylene glycol monomethyl ether, and dipropylene glycol monomethyl ether; ketones such as methyl ethyl ketone, methyl isobutyl ketone, and methyl amyl ketone; esters such as ethyl acetate and butyl acetate; and water.

<Zinc Oxide (B)>

The present composition includes zinc oxide (B).

The properties such as the form and average particle diameter of the zinc oxide (B) are not particularly limited, and the present composition may include 2 or more types of zinc oxide having different forms and/or average particle diameters.

Due to the present composition including the zinc oxide (B), an antifouling coating film having sufficient antifouling properties and excellent water resistance and damage resistance can be easily obtained.

From the viewpoints of, for example, good dispersibility of the zinc oxide (B) in the present composition and the improved antifouling properties of an obtained antifouling coating film, the average particle diameter (median diameter) of the zinc oxide (B) is preferably 0.01 μm or greater, more preferably 0.05 μm or greater, and particularly preferably 0.1 μm or greater, and is preferably 10 μm or less and more preferably 5 μm or less.

In the present specification, the average particle diameter (median diameter) is a value measured with SALD-2200 (produced by Shimadzu Corporation) by a laser diffraction scattering method.

The content of the zinc oxide (B) in the present composition relative to 100 parts by mass of the content of the copolymer (A) is 70 parts by mass or greater and 200 parts by mass or less, preferably 75 parts by mass or greater, more preferably 80 parts by mass or greater, and still more preferably 100 parts by mass or greater, and is preferably 190 parts by mass or less, more preferably 180 parts by mass or less, and still more preferably 160 parts by mass or less in the aspect that an antifouling coating film having sufficient antifouling properties and excellent repairability can be easily obtained for example.

<Other Optional Components>

In addition to the (A) and (B), the present composition may contain optional components other than the (A) and (B) depending on necessity, exemplified by an antifouling agent (C), other pigment (D), a monocarboxylic acid compound (E), a defoaming agent (F), a solvent (G), an anti-sagging agent/anti-settling agent (H), a plasticizer (I), other binder component (J), a wetting dispersant (K), and a dehydrating agent (L).

[Antifouling Agent (C)]

It is preferred that the present composition further contains an antifouling agent (C) in order to increase the antifouling properties of an antifouling coating film formed from the present composition.

When containing the antifouling agent (C), the present composition may contain 1 or more types of the antifouling agents (C).

Examples of the antifouling agent (C) include (+/−)-4-[1-(2,3-dimethylphenyl)ethyl]-1H-imidazol (trivial name: medetomidine), 4-bromo-2-(4-chlorophenyl) (trifluoromethyl)-1H-pyrrol-3-carbonitrile (trivial name: tralopyril), metal pyrithiones such as copper pyrithione and zinc pyrithione, 4,5-dichloro-2-n-octyl-4-isothiazolin-3-one (trivial name: DCOIT), borane-nitrogen base adducts such as pyridine triphenyl borane and 4-isopropylpyridine(N—B) methyl(diphenyl)borane, cuprous oxide, copper oxide, copper (metal copper), and copper thiocyanate (trivial name: copper rhodanide). Among the above, medetomidine, tralopyril, metal pyrithiones such as copper pyrithione and zinc pyrithione, or cuprous oxide is preferably included.

When the present composition contains the antifouling agent (C), the content thereof relative to 100% by mass of solids included in the present composition is preferably 1% by mass or greater, and more preferably 5% by mass or greater, and is preferably 70% by mass or less, and more preferably 50% by mass or less in the aspect that an antifouling coating film having sufficient antifouling properties can be easily obtained for example.

Two or more types of the antifouling agents (C) may be used. In this case, suitable combinations include medetomidine and copper pyrithione; medetomidine and zinc pyrithione; medetomidine, cuprous oxide, and copper pyrithione; and tralopyril and zinc pyrithione in the aspects, for example, that an antifouling coating composition having excellent storage stability can be easily obtained and that an antifouling coating film having sufficient antifouling properties and excellent water resistance can be easily obtained.

The medetomidine is a compound represented by the formula (4) below.

Due to the zinc oxide (B) contained as an essential component in the present composition, when the present composition further contains medetomidine, an antifouling coating film having excellent barnacle resistance sustained over a long period can be easily obtained by contribution which is presumed to be made by an interaction between zinc and medetomidine.

[Chem. 11]

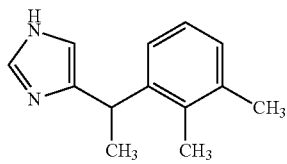

(4)

Medetomidine has optical isomerism, and may be only one of the optical isomers thereof or a mixture of the optical isomers in a given proportion.

The present composition may use an imidazolium salt or an adduct of medetomidine to a metal for example, as a part or the whole of medetomidine. In this case, an imidazolium salt or an adduct of medetomidine to a metal for example, may be used as a raw material used in the preparation of the present composition, or an imidazolium salt or an adduct of medetomidine to a metal for example may be formed in the present composition or an antifouling coating film.

When the present composition contains medetomidine, the content thereof relative to 100% by mass of solids included in the present composition is preferably 0.02% by mass or greater, and more preferably 0.05% by mass or greater, and is preferably 2% by mass or less, and more preferably 0.5% by mass or less in the aspect that an antifouling coating film having sufficient antifouling properties can be easily obtained for example.

In addition, when the present composition contains tralopyril, the content thereof relative to 100% by mass of solids included in the present composition is preferably 1% by mass or greater, and more preferably 2° by mass or greater, and is preferably 10° by mass or less, and more preferably 8° by mass or less in the aspect that an antifouling coating film having sufficient antifouling properties can be easily obtained for example.

As the metal pyrithiones, copper pyrithione and zinc pyrithione are preferred, and copper pyrithione is preferred in the aspects, for example, that an antifouling coating film having excellent water resistance, crack resistance and repairability can be easily obtained, and particularly that an antifouling coating film having antifouling properties sustained over a long period while suppressing a coating film consumption degree can be easily obtained.

When the present composition contains metal pyrithiones, the content thereof relative to 100% by mass of solids included in the present composition is preferably 1% by mass or greater, more preferably 3% by mass or greater, and is preferably 20% by mass or less, and more preferably 15% by mass or less, in the aspect that an antifouling coating film having sufficient antifouling properties can be easily obtained for example.

As the cuprous oxide, cuprous oxide in the form of particles having an average particle diameter (median diameter) of approximately 0.1 to 30 µm is preferred in the aspect that an antifouling coating film having antifouling properties sustained over a long period can be easily obtained for example. Cuprous oxide that is surface-treated with material(s) such as glycerin, stearic acid, lauric acid, sucrose, lecithin, and mineral oil are preferred in the aspect that an antifouling coating composition having excellent long-term stability during storage can be easily obtained for example.

Examples of the commercially available products of the cuprous oxide include NC-301 (produced by NC-TECH Co., Ltd.), NC-803 (produced by NC-TECH Co., Ltd.), Red Copp 97N Premium (produced by AMERICAN CHEMET Co.), Purple Copp (produced by AMERICAN CHEMET Co.), and LoLoTint97 (produced by AMERICAN CHEMET Co.).

When the present composition contains cuprous oxide, the content thereof relative to 100% by mass of solids included in the present composition is preferably 10% by mass or greater, and more preferably 20% by mass or greater, and is preferably 50% by mass or less, and more preferably 40% by mass or less, in the aspect that an antifouling coating film having an appropriate coating film consumption degree and sufficient antifouling properties can be easily obtained for example.

[Other Pigment (D)]

For the purpose of coloring a coating film or hiding a base, and further for the purpose of adjusting coating film strength to an appropriate level for example, the present composition may contain a pigment (D) other than the zinc oxide (B) and the antifouling agent (C).

When the present composition contains the other pigment (D), it may include 1 or more types of the other pigment (D).

Examples of the other pigment (D) include extender pigments such as zinc phosphate, talc, mica, clay, potassium feldspar, calcium carbonate, kaolin, alumina white, white carbon, aluminum hydroxide, magnesium carbonate, barium carbonate, barium sulfate, calcium sulfate, and zinc sulfide, and coloring pigments such as red iron oxide, titanium white (titanium oxide), yellow iron oxide, carbon black, naphthol red, and phthalocyanine blue.

When the present composition contains the other pigment (D), the total content thereof can be appropriately determined in accordance with hiding properties required for an antifouling coating film to be formed and the viscosity of an antifouling coating composition, and is preferably 1 to 40% by mass relative to 100% by mass of solids included in the present composition.

In the aspect that an antifouling coating film having sufficient antifouling properties and excellent color fastness and crack resistance can be easily obtained for example, zinc phosphate is preferably contained as the other pigment (D). When the present composition contains zinc phosphate, the content thereof relative to 100% by mass of solids included in the present composition is preferably 2% by mass or greater, and more preferably 5% by mass or greater, and is preferably 20% by mass or less, and more preferably 10% by mass or less.

In the aspect that an antifouling coating film having excellent water resistance can be easily obtained for example, calcium sulfate is preferably contained as the other pigment (D). When the present composition contains calcium sulfate, the content thereof relative to 100% by mass of solids included in the present composition is preferably 0.1% by mass or greater, and more preferably 0.5% by mass or greater, and is preferably 5% by mass or less, and more preferably 2% by mass or less.

In the aspect that an antifouling coating film having excellent crack resistance can be easily obtained for example, talc is preferably contained as the other pigment (D). When the present composition contains talc, the content thereof relative to 100% by mass of solids included in the present composition is preferably 1% by mass or greater, and more preferably 2% by mass or greater, and is preferably 20% by mass or less, and more preferably 10% by mass or less.

[Monocarboxylic Acid Compound (E)]

The present composition may contain a monocarboxylic acid compound (E). When the present composition contains the compound (E), the renewability from a surface of a formed antifouling coating film in water tends to be increased. Moreover, when the antifouling coating film contains an antifouling agent, the release of the antifouling agent in water tends to be promoted resulting in the enhanced antifouling properties of the antifouling coating film. The compound (E) also tends to have a function of imparting appropriate water resistance to the antifouling coating film, and due to the compound (E), good coating workability of an antifouling coating composition tends to be achieved in addition.

When the present composition contains the compound (E), the present composition may contain 1 or more types of the compounds (E).

As the compound (E), for example, compounds represented by R—COOH (in which R is a saturated or unsaturated aliphatic hydrocarbon group having 10 to 40 carbon atoms, a saturated or unsaturated alicyclic hydrocarbon group having 3 to 40 carbon atoms, or a hydrocarbon group having 3 to 40 carbon atoms in which a hydrogen atom in a saturated or unsaturated alicyclic hydrocarbon group is substituted with a saturated or unsaturated aliphatic hydrocarbon group), or derivatives thereof (such as metal esters) are preferred.

Preferred examples of the compound (E) include specifically abietic acid, neoabietic acid, dehydroabietic acid, palustric acid, isopimaric acid, pimaric acid, trimethylisobutenylcyclohexene carboxylic acid, versatic acid, stearic acid, and naphthenic acid, and among the compounds, versatic acid is particularly preferred in the aspect that an antifouling coating film having excellent coating film physical properties can be easily obtained for example.

As the compound (E), rosins composed mainly of compounds such as abietic acid, palustric acid, and isopimaric acid are also preferred. Examples of the rosins are rosins such as gum rosin, wood rosin, and tall oil rosin, and rosin derivatives such as hydrogenated rosin, disproportionated rosin, and rosin metal salts, and pine tar.

The compound (E) may be a metal ester. The metal ester is exemplified by zinc ester or copper ester. When the present composition contains the metal ester, the metal ester may be used as a raw material used in the preparation of the present composition, or the metal ester may be formed in the present composition or an antifouling coating film.

When the present composition contains the compound (E), the content thereof relative to 100% by mass of solids included in the present composition is preferably 0.1% by mass or greater, and more preferably 1% by mass or greater, and is preferably 50% by mass or less, and more preferably 20% by mass or less in the aspects, for example, that an antifouling coating composition having excellent coating workability can be easily obtained and that an antifouling coating film having excellent water resistance can be easily obtained.

[Defoaming Agent (F)]

The present invention may contain a defoaming agent (F). The defoaming agent is exemplified by an agent having an action of suppressing the formation of foam by disproportioning a surface of foam to be formed, or an action of breaking foam by locally thinning a surface of formed foam. When the present composition contains a defoaming agent, the inhibition of the smoothness of a coating film form being attributable to foaming during the formation of the coating film can be suppressed.

When the present composition contains the defoaming agent (F), the present composition may contain 1 or more types of the defoaming agents (F).

The defoaming agent (F) is exemplified by a silicone defoaming agent or a nonsilicone defoaming agent.

The silicone defoaming agent is exemplified by a defoaming agent containing a polysiloxane having surface activity or a modified product thereof, and the nonsilicone defoaming agent is exemplified by a defoaming agent except for silicone defoaming agents (such as a defoaming agent being free of polysiloxane or a modified product thereof).

Examples of the silicone defoaming agent include defoaming agents of an oil type, a compound type, a self-emulsifying type, or an emulsion type.

Examples of the nonsilicone defoaming agent include defoaming agents of a higher alcohol type, a higher alcohol derivative type, a fatty acid type, a fatty acid derivative type, a paraffin type, a polymer type (such as (meth)acrylic polymer type), or a mineral oil type.

In terms of, for example, the defoaming properties of the antifouling coating composition (particularly the defoaming properties of the antifouling coating composition after storage for a given period), the low friction properties of an antifouling coating film and/or the adhesion of an antifouling coating film to a base, the present composition contains as the defoaming agent (F), preferably a silicone defoaming agent, more preferably a silicone defoaming agent alone, still more preferably a fluorine-modified silicone defoaming agent, and particularly preferably a fluorine-modified silicone defoaming agent alone.

The fluorine-modified silicone defoaming agent is a defoaming agent having a fluorine-modified polysiloxane structure.

As the defoaming agent (F), commercially available products may also be used.

Examples of the commercially available fluorine-modified silicone defoaming agents are fluorosilicone oil defoaming agents such as "BYK-066N" produced by BYK Chemie Japan K.K., and "FA-630" produced by Shin-Etsu Chemical Co., Ltd.

Examples of the commercially available silicone defoaming agents other than fluorine-modified silicone defoaming agents are silicone-oil defoaming agents such as "KF-96" produced by Shin-Etsu Chemical Co., Ltd., and "BYK-081" produced by BYK Chemie Japan K.K.

Examples of the commercially available nonsilicone defoaming agents are mineral oil defoaming agents such as "BYK-030" produced by BYK Chemie Japan K.K., and polymer defoaming agents such as "DISPARLON OX68"

produced by Kusumoto Chemicals, Ltd., and "BYK-1790" produced by BYK Chemie Japan, K.K.

When the present composition includes the defoaming agent (F), the content in its present state relative to 100 parts by mass of the content of the copolymer (A) is preferably 0.1 parts by mass or greater, and more preferably 0.2 parts by mass or greater, and is preferably 1 part by mass or less, and more preferably 0.6 parts by mass or less.

For example, when a defoaming agent having "a"% of solids is used as the defoaming agent (F) in the preparation of the present composition in an amount of "b" parts by mass relative to 100 parts by mass of the copolymer (A), the "content in its present state" of the defoaming agent (F) is "b" parts by mass.

[Solvent (G)]

The present composition may include a solvent (G) such as water or an organic solvent depending on necessity in order to adjust the viscosity of the composition for example. In the present composition, for example, a liquid containing the copolymer (A) obtained during the synthesis of the copolymer (A) may be used as is. In this case, the solvent (G) is for example a solvent included in the above liquid, or a solvent which is separately added when mixing the copolymer (A) and other optional components depending on necessity. As the solvent (G), an organic solvent is preferred.

When the present composition contains the solvent (G), the present composition may contain 1 or more types of the solvents (G).

Examples of the organic solvent include aromatic organic solvents such as xylene, toluene, and ethylbenzene; ketones such as methyl ethyl ketone, methyl isobutyl ketone, and cyclohexanone; monovalent aliphatic alcohols (with 1 to 10, preferably approximately 2 to 5 carbon atoms) such as ethanol, isopropyl alcohol, n-butanol, isobutanol, and propyleneglycolmonomethyl ether; and ester solvents such as ethyl acetate and butyl acetate.

When the present composition contains the solvent (G), the content thereof may be appropriately determined such that an intended viscosity in accordance with a method for applying an antifouling coating composition can be achieved, and the preferred content relative to 100% by mass of the present composition is ordinarily approximately from 0 to 50% by mass. If the content of the solvent (G) is excessively high, problems such as reduced anti-sagging properties may occur.

[Anti-Sagging Agent/Anti-Settling Agent (H)]

The present composition may contain an anti-sagging agent/anti-settling agent (H) in order to adjust the viscosity of the present composition for example.

When the present composition includes the anti-sagging agent/anti-settling agent (H), the present composition may include 1 or more types of the anti-sagging agents/anti-settling agents (H).

Examples of the anti-sagging agent/anti-settling agent (H) include organic clay waxes (such as stearate salts, lecithin salts, and alkylsulfonate salts of Al, Ca, or Zn), organic waxes (such as polyethylene wax, oxidized polyethylene wax, amide wax, polyamide wax, and hydrogenated castor oil wax), mixtures of organic clay waxes and organic waxes, and synthetic fine powder silica.

As the anti-sagging agent/anti-settling agent (H), commercially available products may be used. Examples of the commercially available products are "DISPARLON 305", "DISPARLON 4200-20", "DISPARLON A630-20X" and "DISPARLON 6900-20X" produced by Kusumoto Chemicals, Ltd., and "A-S-A D-120" produced by Itoh Oil Chemicals Co., Ltd.

When the present composition contains the anti-sagging agent/anti-settling agent (H), the content thereof relative to 100% by mass of solids included in the present composition is preferably 0.01% by mass or greater, and more preferably 0.1% by mass or greater, and is preferably 10% by mass or less, and more preferably 3% by mass or less.

[Plasticizer (I)]

The present composition may contain a plasticizer (I) to impart plasticity to an antifouling coating film for example.

When the present composition contains the plasticizer (I), the present composition may contain 1 or more types of the plasticizers (I).

Examples of the plasticizer (I) include tricresyl phosphate (TCP), dioctyl phthalate (DOP), and diisodecyl phthalate (DIDP).

When the present composition contains the plasticizer (I), the content thereof relative to 100% by mass of solids included in the present composition is preferably 0.1% by mass or greater, and more preferably 0.5% by mass or greater, and is preferably 10% by mass or less, and more preferably 5% by mass or less in the aspect that the plasticity of an antifouling coating film can be favorably maintained for example.

[Other Binder Component (J)]

The present composition may contain other binder component (J) other than the copolymer (A) for the purpose for example of imparting water resistance, crack resistance, and strength to a formed antifouling coating film.

When the present composition contains the component (J), the present composition may contain 1 or more types of the components (J).

Examples of the other binder component (J) include polyester polymers, (meth)acrylic (co)polymers ((meth)acrylic resin), vinyl (co)polymers (including, for example, polyvinyl ethyl ether), chlorinated paraffin, n-paraffin, terpene phenol resin, petroleum resins, and ketone resins. Among the above, polyester polymers, (meth)acrylic (co)polymers, vinyl (co)polymers, chlorinated paraffin, and petroleum resins are preferred, and polyester polymers, chlorinated paraffin, and petroleum resins are more preferred. As the (meth)acrylic (co)polymers or vinyl (co)polymers, polymers obtained by using 1 or more types of the monomers described as the monomers (a3) and (a4) may be used.

When the present composition contains the other binder component (J), the content thereof relative to 100% by mass of solids included in the present composition is preferably 0.1 to 40% by mass.

When the present composition contains a polyester polymer, an antifouling coating film having sufficient antifouling properties and excellent crack resistance can be easily obtained. An antifouling coating film obtained from the present composition tends to have rather reduced crack resistance particularly due to the properties of the copolymer (A), and thus the physical properties of the coating film can be improved by using the other binder component (J) simultaneously. However, the other binder component (J) frequently reduces antifouling properties of the antifouling coating film. When a polyester polymer is used as the other binder component (J), the crack resistance of an antifouling coating film can also be improved without reducing the antifouling properties of the antifouling coating film.

The polyester polymer can be obtained via a reaction among 1 or more polyhydric alcohols, 1 or more polyhydric carboxylic acids and/or anhydrides thereof, and optionally the other component. By adjusting the combination thereof, the properties such as hydroxyl value/acid value and viscosity can be adjusted.

Examples of the polyhydric alcohols include propylene glycol, glycerin, ethylene glycol, 1,6-hexandiol, trimethylol propane (TMP), pentaerythritol, sorbitol; and polyalkylene glycols such as diethylene glycol, and in terms of, for example, availability of raw materials, propylene glycol, glycerin, and TMP are preferred.

Two or more of the above polyhydric alcohols may be used.

Examples of the polyhydric carboxylic acid and/or the anhydrides thereof include malonic acid, maleic acid, fumaric acid, glutaric acid, adipic acid, pimelic acid, suberic acid, azelaic acid, sebacic acid, 1,9-nonamethylene dicarboxylic acid, 1,10-decamethylene dicarboxylic acid, 1,11-undecamethylene dicarboxylic acid, 1,12-dodecamethylene dicarboxylic acid, cyclohexane dicarboxylic acid, decahydronaphthalene dicarboxylic acid, terephthalic acid, isophthalic acid, phthalic acid, hexahydrophthalic acid, succinic acid, and anhydrides thereof. Among the above, phthalic acid anhydride and hexahydrophthalic acid anhydride are preferred.

In the aspects, for example, that an antifouling coating composition having excellent storage stability can be easily obtained and that an antifouling coating film having appropriate hydrophilicity and sufficient antifouling properties can be easily obtained, the hydroxyl value of solids in the polyester polymer is preferably 50 mgKOH/g or greater, and more preferably 80 mgKOH/g or greater, and is preferably 150 mgKOH/g or less, and more preferably 130 mgKOH/g or less.

The polyester polymer may be used in a form of a solution (this may be hereinafter referred to as "polyester polymer solution") by dissolving it in a solvent. As the solvent, the same solvents as those described as examples of the above solvent (G) may be used.

When the polyester polymer is obtained by the reaction, the polyester polymer solution may contain unreacted raw materials.

As the polyester polymer solution, a solution having a viscosity at a temperature of 25° C. preferably of 3,000 mPa·s or less, more preferably 1,000 mPa·s or less is desirable in the aspect that the viscosity of an antifouling coating composition can be reduced for example.

Examples of the polyester polymer include Teslack 2474 (polyester polyol, hydroxyl value: 121 mgKOH/g), and Teslack 2462 produced by Hitachi Chemical Company, Ltd.

When the present composition contains the polyester polymer, the content thereof relative to 100% by mass of the solids included in the present composition is preferably 0.1% by mass or greater, more preferably 0.5% by mass or greater, and still more preferably 1.0% by mass or greater, and is preferably 40% by mass or less, more preferably 30% by mass or less, and still more preferably 20% by mass or less.

The chlorinated paraffin may have either a linear molecular structure or a branched molecular structure, and may be in a liquid form or in a solid form (such as a powder form) under conditions at room temperature (such as 23° C.)

The average carbon number in a molecule of the chlorinated paraffin is preferably 8 or greater, and more preferably 10 or greater, and is preferably 30 or less, and more preferably 26 or less.

By using such chlorinated paraffin, an antifouling coating film with less cracks or peeling for example can be easily formed. When the average carbon number is less than 8, the effects of suppressing crack occurrence in a formed antifouling coating film may be insufficient. In contrast, when the average carbon number is greater than 30, hydrolyzability (coating film consumption degree, renewability, and abrasive properties) of a formed antifouling coating film may be excessively small, resulting in poor antifouling properties.

The viscosity of the chlorinated paraffin (unit: poise, measured at 25° C.) is preferably 1 or greater, and more preferably 1.2 or greater. The specific gravity thereof (at 25° C.) is preferably 1.05 g/cm$^3$ or greater, and more preferably 1.10 g/cm$^3$ or greater, and is preferably 1.80 g/cm$^3$ or less, and more preferably 1.70 g/cm$^3$ or less.

The chlorination rate (chlorine content) of the chlorinated paraffin relative to 100% by mass of the chlorinated paraffin is ordinarily 35 to 70% by mass, and preferably 35 to 65% by mass. Using the chlorinated paraffin having such a chlorination rate, an antifouling coating film with reduced cracks and peeling for example can be easily formed.

The petroleum resins are exemplified by C5 type, C9 type, styrene type, and dichloropentadiene type petroleum resins and hydrogenated products thereof.

As the other binder component (J), commercially available products may be used. Examples of the commercially available products include "Dianal BR-106" produced by Mitsubishi Rayon Co., Ltd., as a (meth)acrylic copolymer ((meth)acrylic resin); "Toyoparax A-40/A-50/A-70/A-145/A-150/150" produced by Tosoh Corporation as a chlorinated paraffin; and "Quintone 1500" and "Quintone 1700" (both produced by Zeon Corporation) as petroleum resins.

[Wetting Dispersant (K)]

For the purpose for example of increasing dispersibility of the zinc oxide (B), the antifouling agent (C), and the other pigment (D) in an antifouling coating composition, the present composition may contain a wetting dispersant (K).

When the present composition contains the wetting dispersant (K), the present composition may contain 1 or more types of the wetting dispersants (K).

The wetting dispersant (K) is generally used to increase efficiency in dispersing pigments during the production of coating materials. Particularly, due to the copolymer (A) which tends to have low surface free energy, being used in the present composition, pigments or antifouling agents having high polarity may cause insufficient surface wetting and thus the uniform dispersion of such pigments or antifouling agents may insufficiently progress. As a result, the physical properties of an obtained antifouling coating film such as crack resistance may be deteriorated. Thus, the present composition preferably contains the wetting dispersant (K) in the aspect that an antifouling coating film having favorable physical properties can be easily obtained for example.

The wetting dispersant (K) is exemplified by various types of publicly-known organic or inorganic pigment dispersants. Specific examples thereof include aliphatic amines and polyfunctional organic acids (such as "Disperbyk 101 (salts of long chain polyaminoamide and polar acid ester) and "Disperbyk 108" (hydroxyl group-containing carboxylic acid ester) produced by BYK Chemie Japan, K.K.).

When the present composition contains the wetting dispersant (K), the content thereof relative to 100° by mass of solids included in the present composition is preferably 0.01° by mass or greater, and more preferably 0.1° by mass or greater, and is preferably 10% by mass or less, and more preferably 5% by mass or less in the aspect that an antifouling coating film having excellent crack resistance and water resistance can be easily obtained for example.

[Dehydrating Agent (L)]

The present composition may contain a dehydrating agent (L) for the purpose for example of increasing the storage stability thereof.

When the present composition contains the dehydrating agent (L), the present composition may contain 1 or more types of the dehydrating agents (L).

Examples of the dehydrating agent (L) include inorganic dehydrating agents such as synthetic zeolite, anhydrous gypsum, and hemihydrate gypsum (trivial name: calcined gypsum); organic dehydrating agents such as alkoxysilanes such as tetramethoxysilane, tetraethoxysilane, tetrabutoxysilane, tetraphenoxysilane, methyltriethoxysilane, dimethyldiethoxysilane, and trimethylethoxysilane, or condensates thereof; and orthoformate alkyl esters such as methyl orthoformate and ethyl orthoformate.

When the present composition contains the dehydrating agent (L), the content thereof relative to 100% by mass of solids included in the present composition is preferably 0.1% by mass or greater, and more preferably 0.2% by mass or greater, and is preferably 20% by mass or less, and more preferably 15% by mass or less.

<Method for Preparing the Present Composition>

The present composition may be prepared by using for example the same apparatus and methods as those used in preparing publicly-known generic antifouling coating compositions.

Specifically, the present composition may be prepared by synthesizing the copolymer (A), thereafter by adding (the solution of) the obtained copolymer (A), the zinc oxide (B), and if needed, the other optional components in a lump or successively to a container, and by stirring and mixing the content of the container. During the preparation, it is preferred that the copolymer (A) is previously brought into contact with the zinc oxide (B).

<Physical Properties of the Present Composition (Acid Value of Solvent-Soluble Content)>

The acid value of the solvent-soluble content of the present composition is preferably 30 mgKOH/g or greater, and more preferably 40 mgKOH/g or greater, and is preferably 95 mgKOH/g or less, and more preferably 90 mgKOH/g or less in the aspect that an antifouling coating film having antifouling properties sustained over a long period while suppressing a coating film consumption degree, and also having excellent water resistance can be easily obtained for example.

According to the present invention, "an acid value of a solvent-soluble content" means an acid value of the components (mixture) being soluble in a later-described specific solvent, which are included in solids obtained by excluding volatile components from a coating composition. The components being soluble in the solvent are believed to be components that form a continuous phase of a coating film, mainly such as resin and resin acids (such as rosin and versatic acid). The acid value of the solvent-soluble content is an average value of the acid values of such components, and indicates the overall acid concentration in the continuous phase of the coating film. When the acid value is within the above range, excellent effects described above are believed to be obtained.

The acid value is defined by the amount (mg) of potassium hydroxide (KOH) which is required to neutralize 1 g of a target component, expressed in the unit of mgKOH/g, and widely used to indicate the acid group content of a target material.

With respect to a solvent-soluble content obtained by extracting the present composition with a solvent, the acid value of the solvent-soluble content can be measured for example by a method in accordance with JIS K 5601-2-1: 1999. As a solvent used in the extraction, a xylene/ethanol mixed solution (xylene/ethanol=70/30 (mass ratio), which is applied to all the mixed solutions hereinafter) is used in general from the viewpoint that components such as resin which form a continuous phase in the present composition are dissolved.

The acid value of a solvent-soluble content can be measured for example by a method specifically including the following steps (1) to (6):

(1) The weighed present composition and a xylene/ethanol mixed solution having a mass approximately 10 times the mass of the weighed present composition are fed into a centrifuge tube and are sufficiently mixed;

(2) After centrifugation under the conditions at 0° C. and 3,500 rpm for 30 minutes, the supernatant is extracted and transferred to another container;

(3) A xylene/ethanol mixed solution in the same amount as that described in (1) is added again to the extraction residue and mixed therewith, centrifugation is performed under the same conditions as described in (2), and the supernatant is extracted and is added to the container to which the supernatant in the first cycle was transferred. This operation is further repeated once more;

(4) The supernatants obtained by the centrifugation repeated 3 times in sum are regarded as an extract and the % by mass of solids included in the extract is measured. For the % by mass of solids, a part of the extract is weighed, the weighed extract is dried in a hot air dryer at a temperature of 108° C. for 3 hours, the mass of the remaining solids is measured, and the ratio of the mass of the solids included in the weighed extract is calculated;

(5) Approximately 5 g of the extract is poured into a beaker, the mass of the extract is measured, and the mass of a solvent-soluble content which is to be a sample in the extract is calculated using the value of the ° by mass of solids obtained in the above (4). The obtained value is referred to as x. The extract is diluted with ethanol such that the total amount is 50 mL;

(6) a 0.1 mol/L potassium hydroxide solution (alcoholic) (N/10) (produced by Kanto Chemical Co., Inc.) is used in relation to the ethanol dilution of the extract prepared in the above (5), and 50 mL of ethanol as a blank, a potentiometric titration is performed at a temperature of 20° C. and an acid value AV is calculated based on the following formula:

$$AV=\{(V_X-V_0) \times f \times 5.61\}/x$$

x: mass of sample (g)

$V_X$: titer (mL) in relation to ethanol dilution $V_0$: titer (mL) in relation to blank f: factor of 0.1 mol/L potassium hydroxide solution used in the titration.

In the potentiometric titration, Hiranuma automatic titrator COM-1750 (produced by HIRANUMA Co., Ltd.) is used.

By the same method, a solution-soluble content can also be extracted not only from a coating composition but also from a formed coating film and the acid value thereof can be measured.

<<Antifouling Coating Film, Substrate with Antifouling Coating Film and Method for Producing the Same, and Antifouling Method for Substrate>>

An antifouling coating film according to an embodiment of the present invention (this may be hereinafter referred to as "the present coating film") is formed from the present composition and can be ordinarily obtained by drying the present composition. The present coating film is ordinarily formed on a substrate and is used as a substrate with the present coating film having a substrate and the present coating film.

A preferred example of a method for producing a substrate with the present coating film is a method including a step in which the present composition is provided on at least a part of a substrate and is subsequently dried.

An antifouling method for a substrate according to an embodiment of the present invention includes a step of forming the present coating film on at least a part of the substrate. The above method for producing a substrate with the present coating film, including a step of forming the present coating film on at least a part of the substrate, can also be regarded as an antifouling method for a substrate.

The substrate is not particularly limited, but the present composition is preferably utilized for the purposes such as the antifouling of a substrate over a long period in a wide range of industrial fields including ships, fishery, and underwater structures. Examples of the substrate include ships (such as the outside shells of the hulls of large scale steel-hulled ships including container ships and tankers, fishing boats, FRP boats, wooden boats, and yachts; both newly built ships and repaired ships are included), fishing materials (such as ropes, fishing nets, fishing gears, floats and buoys), structures such as oil pipelines, water conduit piping, circulating water piping, diving suits, swimming goggles, oxygen cylinders, swimwear, torpedoes, supply and discharge ports of thermal/nuclear power plants, and underwater structures such as submarine cables, equipment using seawater (such as seawater pumps), mega-floats, coastal roads, submarine tunnels, port facilities, and structures for various underwater civil engineering in, for example, canals and waterways. Among the above, ships, underwater structures, and fishing materials are preferred, ships and underwater structures are more preferred, and ships are particularly preferred.

The substrate may be a substrate treated with other treating agents such as a rust inhibitor, a substrate having a surface on which a coating film such as a primer is formed, or a substrate having a surface on which the present coating film is formed. An object that is brought into direct contact with the present coating film is not particularly limited.

A method for providing the present composition on at least a part of a substrate is not particularly limited, and is exemplified by a method of applying the present composition onto a substrate, or a method of immersing a substrate in the present composition (impregnating the present composition into a substrate).

The method for applying the present composition is exemplified by a publicly-known method using a brush, a roller, or a spray.

The method for drying the present composition is exemplified by a method in which the present composition is left at room temperature (such as 25° C.) preferably for approximately 0.5 to 14 days, and more preferably for approximately 1 to 7 days. The drying may be performed under heating conditions or blowing conditions.

The thickness of the present coating film after drying may be appropriately selected in accordance, for example, with the coating film consumption degree of the present coating film, and the uses and period of use of the present coating film, and a preferred thickness is approximately 30 to 1,000 μm for example. A method for producing a coating film with the above thickness is exemplified by a method in which the present composition is applied once or multiple times in such a way that a dry coating film preferably with a thickness of 10 to 300 μm, more preferably with a thickness of 30 to 200 μm, is obtained per application.

The substrate with the present coating film can also be produced by a method including a step (I') of forming the present coating film and a step (II') of attaching the obtained present coating film to a substrate.

The step (I') is not particularly limited and is exemplified by the above method of providing the present composition on at least a part of a substrate in which a release-processed support is used instead of the substrate depending on necessity.

The step (II') is also not particularly limited and is exemplified by the method described in JP 2013-129724 A.

<<Method for Repairing Substrate with Antifouling Coating Film>>

A method for repairing a substrate with an antifouling coating film according to an embodiment of the present invention includes a step of applying a repair coating material onto a substrate with the present coating film, preferably a substrate with the deteriorated present coating film. Specifically, the method includes, as a method for repairing a substrate with the present coating film which has been deteriorated by the use thereof, a step of applying a repair coating material to the substrate with the deteriorated present coating film.

In this case, the substrate with the deteriorated present coating film may be washed with water for example to remove contamination for example from a surface and dried, and thereafter a repair coating material may be applied onto the surface.

Here, the "substrate with the deteriorated present coating film" means for example a substrate with the present coating film after the use in contact with water (seawater), and is exemplified by a substrate with the present coating film after the end of lifetime of the antifouling coating film. Since the present coating film is ordinarily deteriorated in such a use, the term "deteriorated" is used. However, the degree of the deterioration is not particularly limited and a substrate with the coating film in a state such that the coating film can sufficiently exhibit functions required for the present coating film is also included. The above deterioration may include a case in which, in addition to the present coating film, films such as an anticorrosion coating film and an intermediate coating film, which are ordinarily formed in layers under the present coating film, are damaged.

In other words, the method for repairing a substrate with the antifouling coating film may be specifically a method for repairing an antifouling coating film, a method for repairing films such as an anticorrosion coating film and an intermediate coating film, or a method for repairing including both of the methods. Accordingly, a repair coating material used in the method for repairing a substrate with the antifouling coating film may be appropriately selected depending on objects to be repaired, and an antifouling coating material may be used, an anticorrosion coating material or an intermediate coating material may be used, or an antifouling coating material may be used after an anticorrosion coating material and/or an intermediate coating material are(is) used. As an antifouling coating material in this case, the present composition is preferably used.

When a conventional substrate with a deteriorated antifouling coating film is repaired, objects such as the deteriorated antifouling coating film need to be removed in order to obtain a predetermined substrate due to poor adhesion between the substrate with the deteriorated antifouling coating film and a coating film formed from a repair coating material. In contrast, the present coating film, even when deteriorated, has excellent adhesion to a coating film formed from a repair coating material, and thus a predetermined substrate can be obtained without such a removal treatment.

The repair coating material is exemplified by an antifouling coating material, and coating materials (such as an anticorrosion coating material and an intermediate coating material) which can form a coating film having the same functions as those of a coating film which is ordinarily formed between a substrate and the present coating film. There is no definite distinction between an anticorrosion coating material and an intermediate coating material, and a coating material which can be used as both of these is ordinarily used. Hereinafter coating materials having anticorrosion coating material properties are also referred to as binder coating materials.

As the repair coating material, a binder coating material is preferred in the aspect that the effects of the present invention can be better exhibited for example.

An antifouling coating material used as a repair coating material is not particularly limited, but is preferably the present composition, and more preferably the same composition as the present composition used in forming the deteriorated present coating film.

The binder coating material is exemplified by a coating material containing a resin such as an epoxy resin, a vinyl resin, or a (meth)acrylic resin, or a coating material containing 2 or more thereof. In terms of anticorrosion properties, an epoxy coating material is preferred, in terms of increased adhesion between an anticorrosion coating film and an antifouling coating film for example, a vinyl coating material or a (meth)acrylic coating material is preferred, and from the viewpoint of overall performance, the coating material containing 2 or more of the above resins is also preferred.

In addition to the above resins, publicly-known additives such as a thermoplastic resin, a plasticizer, an inorganic filler, a coloring pigment, a rust inhibitor, an organic solvent, a curing promoter, an anti-sagging agent, and an anti-settling agent may further be added to the binder coating material.

Examples of the epoxy binder coating material are coating materials including 1 or more epoxy resins, and coating materials including 1 or more epoxy resins and 1 or more curing agents are preferred.

The epoxy resins are exemplified by reaction-curable resins having 2 or more epoxy groups in a molecule and being curable by a reaction with a curing agent.

Examples of the epoxy resins include bisphenol type, novolac type, and aliphatic type epoxy resins. From the viewpoints of workability and rust resistance, a bisphenol type epoxy resin is preferred.

As the bisphenol type epoxy resin, a resin having an epoxy equivalent of 160 to 500 is preferred, and a resin having an epoxy equivalent of 180 to 500 is more preferred.

Examples of the bisphenol type epoxy resins include bisphenol A type and bisphenol F type epoxy resins, further dimer acid-modified or polysulfide-modified bisphenol type epoxy resins, and the hydrogenated products of the above bisphenol type epoxy resins. Among the above, bisphenol A type epoxy resins are preferred.

Examples of the bisphenol A type epoxy resins include bisphenol A diglycidyl ethers such as bisphenol A diglycidyl ether, bisphenol A polypropylene oxide diglycidyl ether, and bisphenol A ethylene oxide diglycidyl ether, and examples of the bisphenol F type epoxy resins include bisphenol F type diglycidyl ethers such as bisphenol F diglycidyl ether.

Commercially available bisphenol A type epoxy resins may also be used. Such commercially available products are exemplified by "jER 828" (epoxy equivalent: 184 to 194, viscosity: 12,000 to 15,000 mPa·s/25° C., solids are in a liquid state at room temperature), "jER 834-90X" (epoxy equivalent: 230 to 270, solids are in a semisolid state at room temperature), and "jER 1001-75X" (epoxy equivalent: 450 to 500, solids are in a solid state at room temperature), produced by Mitsubishi Chemical Corporation.

The curing agents are exemplified by amine type, carboxylic acid type, acid anhydride type, and silanol type curing agents, and from the viewpoints of reactivity and adhesion to an object to be coated, amine type curing agents are preferred. As the curing agents, those based on different types may be used simultaneously.

As amine type curing agents, amines having 2 or more functional groups such as aliphatic amines, alicyclic amines, aromatic amines, and heterocyclic amines, and the modified products thereof are ordinarily used. The above amines are distinguished from each other in the types of carbon to which an amino group is bonded. For example, an aliphatic amine means a compound having at least 1 amino group bonding to an aliphatic carbon.

Epoxy coating materials to which an amine type curing agent is added is suitable for uses being applied under circumstances at room temperature due to their curability at room temperature.

Examples of the aliphatic amines include diethylenetriamine, dipropylenetriamine, tetraethylenepentamine, bis(cyanoethyl)diethylenetriamine, bishexamethylenetriamine, norbornane diamine (which may be NBDA/2,5- or 2,6-bis(aminomethyl)-bicyclo[2,2,1]heptane or an isomer mixture thereof), isophorone diamine (IPDA/1-amino aminomethyl-3,5,5-trimethylcyclohexane), and m-xylylene diamine (MXDA).

Examples of the alicyclic amines include 1,4-cyclohexanediamine, and 4,4'-methylenebiscyclohexylamine.

Examples of the aromatic amines include phenylenediamine, 4.4'-diaminobenzophenone, 4,4'-diaminodiphenylether, and 4,4'-diaminodiphenylsulfone.

Examples of the heterocyclic amines include N-methylpiperazine.

Examples of the modified products of the amines include polyamides of the amines and the modified products thereof, epoxy adducts in which an epoxy compound is added, and Mannich modified products. In terms of the curability of epoxy coating materials, epoxy adducts are preferred, and in the aspect that a coating film having excellent corrosion resistance and adhesion to an object to be coated can be obtained, polyamides and the modified products thereof are preferred.

In terms of the balance between the curability of an epoxy coating material and the adhesion of an obtained coating film to an object to be coated, the active hydrogen equivalent of an amine type curing agent is preferably 40 g/eq or greater, and more preferably 80 g/eq or greater, and is preferably 1,000 g/eq or less, and more preferably 600 g/eq or less.

Specific examples of amine type curing agents include polyamides such as "Luckamide N-153", and "Luckamide TD-966" produced by DIC Corporation, and "Sunmide 315"

produced by Sanwa Chemical Industry Co., Ltd.; and modified products of polyamides such as "PA-23" produced by Ohtake-Meishin Chemical, Co., Ltd., which is an epoxy adduct obtained by adding an epoxy compound to a polyamide, and "ADEKA HARDENER EH-350" produced by ADEKA Corporation, which is a Mannich modified product of a modified polyamide.

As the amine type curing agent, a ketimine type curing agent in which the amine is modified with a ketone may also be used.

Specific examples of the ketimine type curing agents include "ANCAMINE MCA" produced by Air Products Japan K.K., which is a ketimine type of modified alicyclic polyamine.

With respect to the epoxy coating materials, an amine type curing agent is preferably used to an epoxy resin in an amount such that the equivalent ratio of an epoxy component to an amine component (epoxy equivalent:active hydrogen equivalent) is preferably 1:0.25 to 1:0.9, more preferably 1:0.3 to 1:0.8. Using an amine type curing agent in the above amount, a coating film having excellent drying properties, corrosion resistance, and overcoatability (interlayer adhesion to a coating film which can be formed on an epoxy coating material) tends to be obtained.

The amount of an amine type curing agent used relative to 100 parts by mass of an epoxy resin in the epoxy coating material is preferably 10 parts by mass or greater, more preferably 20 parts by mass or greater, and is preferably 80 parts by mass or less, and more preferably 70 parts by mass or less.

EXAMPLES

The present invention is specifically described in further detail below with reference to, but not limited to the examples herein. The term "part(s)" hereinafter means part(s) by mass unless otherwise contrary to the intent thereof.

In the present specification, the "solids" of each component or the present composition mean components remaining after excluding volatile components included as a solvent in each component or the present composition, which is the same as a material obtained by drying each component or the present composition in a hot air dryer at a temperature of 108° C. for 3 hours.

<Production of Hydrolyzable Copolymer (A)>

Production Example M1: Production of Metal Ester Group-Containing Monomer Mixture Into a four-necked flask equipped with a condenser, a thermometer, a dropping funnel, and a stirrer, 85.4 parts of PGM (propyleneglycol monomethyl ether) and 40.7 parts of zinc oxide were fed, which was then heated to a temperature of 75° C. under stirring conditions. Subsequently, a mixture made up of 43.1 parts of methacrylic acid, 36.1 parts of acrylic acid, and 5 parts of water was added dropwise at a constant dropping rate from the dropping funnel for 3 hours. The mixture was further stirred for 2 hours, and 36 parts of PGM was thereafter added to give a transparent metal ester group-containing monomer mixture M1. The mixture M1 included 44.8% by mass of solids.

Production Example 1: Production of Hydrolyzable Copolymer Solution (A-1)

Into a four-necked flask equipped with a condenser, a thermometer, a dropping funnel, and a stirrer, 15 parts of n-butanol, 56 parts of xylene, and 4 parts of ethylacrylate (EA) were fed, which was then heated to a temperature of 100° C. under stirring conditions. Subsequently, a transparent mixture made up of 12.5 parts of n-butylacrylate (BA), 30.2 parts of methylmethacrylate (MMA), 23.2 parts of ethylacrylate, 6 parts of 2-methoxyethylacrylate (2-MEA), 10 parts of X-22-174ASX (product name, produced by Shin-Etsu Chemical Co., Ltd.), 31.3 parts of the metal ester group-containing monomer mixture M1 obtained in Production Example M1, 10 parts of xylene, 0.8 parts of NOFMER MSD (product name, produced by NOF Corporation, chain transfer agent, α-methylstyrene dimer), 1 part of AIBN, and 8 parts of AMEN was added dropwise at a constant dropping rate from the dropping funnel for 6 hours. After the dropping, 2 parts of tert-butylperoxyoctoate (TBPO) and 7 parts of xylene were added dropwise for 90 minutes, the mixture was further stirred for 60 minutes, and 7.5 parts of xylene was thereafter added to give a colorless and transparent hydrolyzable copolymer solution (A-1) having 48.4% solids and a Gardner viscosity of LM.

The Gardner viscosities in Examples below are the results measured at a temperature of 25° C. with a Gardner bubble viscometer.

Production Example 2: Production of Hydrolyzable Copolymer Solution (A-2)

Into a four-necked flask equipped with a condenser, a thermometer, a dropping funnel, and a stirrer, 15 parts of n-butanol, 56 parts of xylene, and 4 parts of ethylacrylate were fed, which was then heated to a temperature of 100° C. under stirring conditions. Subsequently, a transparent mixture made up of 7.5 parts of n-butylacrylate, 26.4 parts of methylmethacrylate, 38 parts of ethylacrylate, 10 parts of X-22-174ASX, 31.3 parts of the metal ester group-containing monomer mixture M1, 10 parts of xylene, 0.8 parts of NOFMER MSD, 1 part of AIBN, and 8 parts of AMEN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 7.5 parts of xylene was thereafter added to give a colorless and transparent hydrolyzable copolymer solution (A-2) having 48.8% solids and a Gardner viscosity of H.

Production Example 3: Production of Hydrolyzable Copolymer Solution (A-3)

Into a four-necked flask equipped with a condenser, a thermometer, a dropping funnel, and a stirrer, 15 parts of n-butanol, 56 parts of xylene, and 4 parts of ethylacrylate were fed, which was then heated to a temperature of 100° C. under stirring conditions. Subsequently, a transparent mixture made up of 17.5 parts of n-butylacrylate, 29.4 parts of methylmethacrylate, 25 parts of ethylacrylate, 10 parts of X-22-174ASX, 31.3 parts of the metal ester group-containing monomer mixture M1, 10 parts of xylene, 0.8 parts of NOFMER MSD, 1 part of AIBN, and 8 parts of AMEN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 7.5 parts of xylene was thereafter added to give a colorless and transparent hydrolyzable copolymer solution (A-3) having 48.5% solids and a Gardner viscosity of IJ.

Production Example 4: Production of Hydrolyzable Copolymer Solution (A-4)

Into a four-necked flask equipped with a condenser, a thermometer, a dropping funnel, and a stirrer, 15 parts of n-butanol, 56 parts of xylene, and 4 parts of ethylacrylate were fed, which was then heated to a temperature of 100° C. under stirring conditions. Subsequently, a transparent mixture made up of 7.5 parts of n-butylacrylate, 37 parts of methylmethacrylate, 32 parts of ethylacrylate, 10 parts of X-22-174ASX, 21.5 parts of the metal ester group-containing monomer mixture M1, 10 parts of xylene, 0.8 parts of NOFMER MSD, 1 part of AIBN, and 8 parts of AMBN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 13 parts of xylene was thereafter added to give a colorless and transparent hydrolyzable copolymer solution (A-4) having 48.5% solids and a Gardner viscosity of BC.

Production Example 5: Production of Hydrolyzable Copolymer Solution (A-5)

Into a four-necked flask equipped with a condenser, a thermometer, a dropping funnel, and a stirrer, 15 parts of n-butanol, 36 parts of xylene, and 4 parts of ethylacrylate were fed, which was then heated to a temperature of 100° C. under stirring conditions. Subsequently, a transparent mixture made up of 7.5 parts of n-butylacrylate, 21 parts of methylmethacrylate, 30.9 parts of ethylacrylate, 12.5 parts of cyclohexylmethacrylate (CHMA), 10 parts of X-22-174ASX, 31.3 parts of the metal ester group-containing monomer mixture M1, 0.8 parts of NOFMER MSD, 1 part of AIBN, and 10 parts of AMBN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 13.5 parts of xylene was thereafter added to give a colorless and transparent hydrolyzable copolymer solution (A-5) having 54.2% solids and a Gardner viscosity of +X.

Production Example 6: Production of Hydrolyzable Copolymer Solution (A-6)

Into a four-necked flask equipped with a condenser, a thermometer, a dropping funnel, and a stirrer, 15 parts of n-butanol, 36 parts of xylene, and 4 parts of ethylacrylate were fed, which was then heated to a temperature of 100° C. under stirring conditions. Subsequently, a transparent mixture made up of 7.5 parts of n-butylacrylate, 18.1 parts of methylmethacrylate, 31.9 parts of ethylacrylate, 12.5 parts of cyclohexylmethacrylate, 10 parts of X-22-174ASX, 35.6 parts of the metal ester group-containing monomer mixture M1, 0.8 parts of NOFMER MSD, 1 part of AIBN, and 10 parts of AMBN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 11.1 parts of xylene was thereafter added to give a colorless and transparent hydrolyzable copolymer solution (A-6) having 54.8% solids and a Gardner viscosity of +Z2.

Production Example 7: Production of Hydrolyzable Copolymer Solution (A-7)

Into a four-necked flask equipped with a condenser, a thermometer, a dropping funnel, and a stirrer, 15 parts of n-butanol, 36 parts of xylene, and 3 parts of ethylacrylate were fed, which was then heated to a temperature of 150° C. under pressurized and stirring conditions. Subsequently, a transparent mixture made up of 30.2 parts of methylmethacrylate, 24.2 parts of ethylacrylate, 12.5 parts of n-butylacrylate, 6 parts of 2-methoxyethylacrylate, 10 parts of X-22-174ASX, 31.3 parts of the metal ester group-containing monomer mixture M1, 0.5 parts of NOFMER MSD, 1 part of AIBN, and 3.5 parts of AMBN was added dropwise at a constant dropping rate from the dropping funnel for 4 hours. After the dropping, 2 parts of TBPO and 10.4 parts of xylene were added dropwise at a temperature of 105° C. for 90 minutes, the mixture was further stirred for 60 minutes, and 10.1 parts of xylene was thereafter added to give a mixture, which was filtrated through a 300 mesh to give a light yellow and transparent hydrolyzable copolymer solution (A-7) having 55.0% solids and a Gardner viscosity of GH, and being free of insoluble matters. No filtration residue was observed on the 300 mesh.

Production Example 8: Production of Hydrolyzable Copolymer Solution (A-8)

Into a four-necked flask equipped with a condenser, a thermometer, a dropping funnel, and a stirrer, 15 parts of n-butanol, 56 parts of xylene, and 4 parts of ethylacrylate were fed, which was then heated to a temperature of 100° C. under stirring conditions. Subsequently, a transparent mixture made up of 12.5 parts of n-butylacrylate, 33.7 parts of methylmethacrylate, 21.5 parts of ethylacrylate, 6 parts of 2-methoxyethylacrylate, 10 parts of X-22-174ASX, 26.1 parts of the metal ester group-containing monomer mixture M1, 10 parts of xylene, 0.8 parts of NOFMER MSD, 1 part of AIBN, and 8 parts of AMBN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 10.5 parts of xylene was thereafter added to give a colorless and transparent hydrolyzable copolymer solution (A-8) having 49.0% solids and a Gardner viscosity of EF.

Production Example 9: Production of Hydrolyzable Copolymer Solution (A-9)

Into a four-necked flask equipped with a condenser, a thermometer, a dropping funnel, and a stirrer, 15 parts of n-butanol, 56 parts of xylene, and 4 parts of ethylacrylate were fed, which was then heated to a temperature of 100° C. under stirring conditions. Subsequently, a transparent mixture made up of 17.5 parts of n-butylacrylate, 29.1 parts of methylmethacrylate, 15.3 parts of ethylacrylate, 20 parts of X-22-174ASX, 31.3 parts of the metal ester group-containing monomer mixture M1, 10 parts of xylene, 0.8 parts of NOFMER MSD, 1 part of AIBN, and 8 parts of AMBN was added dropwise at a constant dropping rate from the dropping funnel for 6 hours. After the dropping, 2 parts of TBPO and 7 parts of xylene were added dropwise for 90 minutes, the mixture was further stirred for 60 minutes, and 7.5 parts of xylene was thereafter added to give a colorless and transparent hydrolyzable copolymer solution (A-9) having 48.7% solids and a Gardner viscosity of EF.

Production Example 10: Production of Hydrolyzable Copolymer Solution (A-10)

Into a four-necked flask equipped with a condenser, a thermometer, a dropping funnel, and a stirrer, 15 parts of n-butanol, 79 parts of xylene, and 4 parts of ethylacrylate were fed, which was then heated to a temperature of 100° C. under stirring conditions. Subsequently, a transparent mixture made up of 23.4 parts of methylmethacrylate, 48 parts of ethylacrylate, 10 parts of X-22-174ASX, 31.3 parts of the metal ester group-containing monomer mixture M1, 30 parts of xylene, 0.8 parts of NOFMER MSD, 1 part of AIBN, and 2 parts of AMBN was added dropwise at a constant dropping rate from the dropping funnel for 6 hours. After the dropping, 2 parts of TBPO and 14 parts of xylene were added dropwise for 90 minutes, the mixture was further stirred for 60 minutes, and 22.5 parts of xylene was thereafter added to give a colorless and transparent hydrolyzable copolymer solution (A-10) having 37.3% solids and a Gardner viscosity of ST.

<Measurement of Number Average Molecular Weight (Mn) And Weight Average Molecular Weight (Mw) of Copolymers>

The Mn and Mw of copolymers included in the obtained hydrolyzable copolymer solutions (A-1) to (A-10) were measured under the conditions below by means of GPC (gel permeation chromatography). The results are summarized in Table 1.

Equipment: "HLC-8320GPC" (produced by Tosoh Corporation)
Column: "TSKgel G4000HXL * G2000HXL" (produced by Tosoh Corporation, size: 7.8 mm<inner diameter>× 30 cm<length>)
Eluent: THF (1 mmol citric acid)
Flow rate: 1.000 mL/min
Detector: RI
Column thermostat chamber temperature: 40° C.
Standard substance: polystyrene
Method for preparing samples: THF (tetrahydrofuran) including 1 mmol of citric acid was added to each of the copolymer solutions prepared in the above Production Examples to dilute the copolymers to have a solids concentration of 0.4% by weight, and the solutions were thereafter filtrated through a membrane filter to obtain filtrates as GPC measurement samples.

TABLE 1

| | | | Production Example 1 (A-1) | Production Example 2 (A-2) | Production Example 3 (A-3) |
|---|---|---|---|---|---|
| Monomers | (a1) | M1 FIGS. in parentheses refer to solids | 31.3 (14.0) | 31.3 (14.0) | 31.3 (14.0) |
| | (a2) | X-22-174ASX | 10.0 | 10.0 | 10.0 |
| | (a3) | BA | 12.5 | 7.5 | 17.5 |
| | | CHMA | | | |
| | (a4) | MMA | 30.2 | 26.4 | 29.4 |
| | | EA | 27.2 | 42.0 | 29.0 |
| | | 2-MEA | 6.0 | | |
| Initiators | | AIBN | 1.0 | 1.0 | 1.0 |
| | | AMBN | 8.0 | 8.0 | 8.0 |
| | | TBPO | 2.0 | 2.0 | 2.0 |
| Chain transfer agent | | NOFMER MSD | 0.8 | 0.8 | 0.8 |
| Physical properties | | Solids in copolymer solution (%) | 48.4 | 48.8 | 48.5 |
| | | Viscosity of copolymer solution | LM | H | IJ |
| | | Mn of copolymer | 1900 | 1900 | 1900 |
| | | Mw of copolymer | 4300 | 4300 | 4300 |
| | | | Production Example 4 (A-4) | Production Example 5 (A-5) | Production Example 6 (A-6) |
| Monomers | (a1) | M1 FIGS. in parentheses refer to solids | 21.5 (9.6) | 31.3 (14.0) | 35.6 (15.9) |
| | (a2) | X-22-174ASX | 10.0 | 10.0 | 10.0 |
| | (a3) | BA | 7.5 | 7.5 | 7.5 |
| | | CHMA | | 12.5 | 12.5 |
| | (a4) | MMA | 37.0 | 21.0 | 18.1 |
| | | EA | 36.0 | 34.9 | 35.9 |
| | | 2-MEA | | | |
| Initiators | | AIBN | 1.0 | 1.0 | 1.0 |
| | | AMBN | 8.0 | 10.0 | 10.0 |
| | | TBPO | 2.0 | 2.0 | 2.0 |
| Chain transfer agent | | NOFMER MSD | 0.8 | 0.8 | 0.8 |
| Physical properties | | Solids in copolymer solution (%) | 48.5 | 54.2 | 54.8 |
| | | Viscosity of copolymer solution | BC | +X | +Z2 |
| | | Mn of copolymer | 2100 | 2000 | 1700 |
| | | Mw of copolymer | 4500 | 4200 | 4000 |

TABLE 1-continued

|  |  | Production Example 7 (A-7) | Production Example 8 (A-8) | Production Example 9 (A-9) | Production Example 10 (A-10) |
|---|---|---|---|---|---|
| Monomers | (a1) M1 | 31.3 | 26.1 | 31.3 | 31.3 |
|  | FIGS. in parentheses refer to solids | (14.0) | (11.7) | (14.0) | (14.0) |
| (a2) | X-22-174ASX | 10.0 | 10.0 | 20.0 | 10.0 |
| (a3) | BA | 12.5 | 12.5 | 17.5 |  |
|  | CHMA |  |  |  |  |
| (a4) | MMA | 30.2 | 33.7 | 29.1 | 23.4 |
|  | EA | 27.2 | 25.5 | 19.3 | 52.0 |
|  | 2-MEA | 6.0 | 6.0 |  |  |
| Initiators | AIBN | 1.0 | 1.0 | 1.0 | 1.0 |
|  | AMBN | 3.5 | 8.0 | 8.0 | 2.0 |
|  | TBPO | 2.0 | 2.0 | 2.0 | 2.0 |
| Chain transfer agent | NOFMER MSD | 0.5 | 0.8 | 0.8 | 0.8 |
| Physical properties | Solids in copolymer solution (%) | 55 | 49 | 48.7 | 37.3 |
|  | Viscosity of copolymer solution | GH | EF | EF | ST |
|  | Mn of copolymer | 1600 | 1900 | 1900 | 2400 |
|  | Mw of copolymer | 3300 | 4000 | 4500 | 6300 |

Details of the components used in Examples and Comparative Examples below are summarized in Table 2.

TABLE 2

| Components |  | Details |
|---|---|---|
| (B) | Zinc oxide | "Zinc oxide No. 3", average particle diameter (median diameter): 0.75 µm, produced by Hakusui Tech Co., Ltd. |
| (C) | Cuprous oxide | "Red Copp 97N Premium" produced by American Chemet Corporation |
|  | Copper pyrithione | "Copper Omadine Powder", chemical formula: $Cu(-S-C_5H_4N-O-)_2$, produced by Arch UK Biocides Ltd. |
|  | Zinc pyrithione | "Zinc Omadine Powder", chemical formula: $Zn(-S-C_5H_4N-O-)_2$, produced by Arch UK Biocides Ltd. |
|  | Medetomidine | "Selektope", chemical name: (±)-4-[1-(2,3-dimethylphenyl)ethyl]-1H-imidazole, produced by I-tech AB |
|  | Tralopyril | "Econea technical", chemical name: 4-bromo-2-(4-chlorophenyl)-5-(trifluoromethyl)-1H-pyrrole-3-carbonitrile, produced by Janssen PMP |
| (D) | Zinc phosphate | "LF Bousei ZP-N" produced by Kikuchi Color & Chemicals Corporation |
|  | Red iron oxide | "Red Iron Oxide No. 404" produced by Morishita Bengara Kogyo Co., Ltd. |
|  | Calcium sulfate | "AS gypsum" produced by San Esu Gypsum Co., Ltd. |
|  | Barium sulfate | "Precipitated Barium 100" produced by Sakai Chemical Industry Co., Ltd. |
|  | Talc | "TTK Talc" produced by Takehara Chemical Industrial Co., Ltd. |
| (E) | Versatic acid | "Versatic 10", neodecanoic acid, produced by Japan Epoxy Resins Co., Ltd. |
|  | Rosin | WW rosin (made in China) |
| (F) | BYK-066N | "BYK-066N", silicone type defoaming agent (Solids: 0.7% by mass), produced by BYK Chemie Japan K.K. |
| (G) | Xylene | — |
|  | PGM | Propyleneglycol monomethyl ether |
| (H) | Aliphatic acid amide | "DISPARLON 6900-20X" (Solids: 20% by mass), produced by Kusumoto Chemicals, Ltd. |
|  | Oxidized polyethylene | "A-S-A D-120" (Solids: 20% by mass), produced by Itoh Oil Chemicals Co., Ltd. |

Examples 1 to 8 and Comparative Examples 1 and 2

Antifouling coating compositions were prepared by mixing and stirring the components in the blending amounts (parts by mass) described in Table 3. The blending amounts of the components described in Table 3 are in its present state. For example, in Example 1, the blending amount of aliphatic acid amide in its present state (i.e., as a whole) is 1.5 parts by mass, and the solids thereof are 20% by mass. Thus, the blending amount of the aliphatic acid amide itself is 0.3 parts by mass.

<Acid Value of Solvent-Soluble Content>

The acid value of the solvent-soluble content of the antifouling coating compositions obtained in the above Examples and Comparative Examples was measured by the above method. The results are summarized in Table 3.

<Coating Material Viscosity>

The viscosity of the antifouling coating compositions obtained in the above Examples and Comparative Examples was measured with a Stormer viscometer. The results are summarized in Table 3.

<Antifouling Properties>

Onto a sand-blasted steel plate (100 mm<length>×70 mm<width>×2.3 mm<thickness>), an epoxy anticorrosive coating material (epoxy AC coating material, product name: "BANNOH 500", produced by CHUGOKU MARINE PAINTS, LTD.) was applied so as to have a dry film thickness of approximately 100 μm, and after 1-day drying, an epoxy binder coating material (product name: "BANNOH 500N" produced by CHUGOKU MARINE PAINTS, LTD.) was applied thereon so as to have a dry film thickness of approximately 100 μm, and this was dried for 1 day. Further thereon, the antifouling coating compositions obtained in the above Examples or Comparative Examples were each applied so as to have a dry film thickness of approximately 200 μm, and these were dried under the conditions at a temperature of 25° C. for 7 days to prepare an antifouling test plate.

The antifouling test plate prepared above was attached to a cylinder rotating such that the test plate surface rotates at a velocity of approximately 15 knots, and while rotating the cylinder at the above speed, the cylinder was immersed to a position approximately 1 meter below the water surface in Hiroshima Bay. The adhesion area of aquatic organisms on the antifouling coating film was measured 6 months (dynamic, 6 months) and 12 months (dynamic, 12 months) after the start of the immersion, and the antifouling properties of the antifouling coating film were evaluated in accordance with the [Evaluation criteria for antifouling properties by referring to adhesion area of aquatic organisms] below. The results are summarized in Table 3.

[Evaluation Criteria for Antifouling Properties by Referring to Adhesion Area of Aquatic Organisms]

5: On the surface of the antifouling test plate, areas occupied by aquatic organisms in total are less than 1% of the whole area.
   4: The areas in total are 1% or greater and less than 10% of the whole area.
   3: The areas in total are 10% or greater and less than 30% of the whole area. 2: The areas in total are 30% or greater and less than 70% of the whole area.
   1: The areas in total are 70% or greater of the whole area.

<Coating Film Consumption Degree>

The antifouling coating composition obtained in the above Examples or Comparative Examples were each applied in a strip onto 2 polyvinyl chloride plates so as to have a dry film thickness of approximately 200 μm, and these were dried at a temperature of 25° C. for 7 days to prepare a test plate with an antifouling coating film. The thickness of the antifouling coating film was measured with a laser film thickness meter.

The 2 test plates with an antifouling coating film prepared above were each attached to a rotation rotor, which was immersed in a seawater aquarium at a temperature adjusted to a temperature of 15° C. or 25° C. while exchanging the seawater predeterminedly, rotated such that the surface of the test plate rotates at approximately 15 knots, and 6 months after the start of the rotation, the thickness of the antifouling coating film was measured again with the laser film thickness meter. With respect to each of the test plates immersed in seawater at a temperature of 15° C. and 25° C., the reduced thickness of the antifouling coating film was divided by 6 and the obtained numerical values were averaged to obtain a coating film consumption degree. The results are summarized in Table 3.

<Damage Resistance Test>

Onto a sand-blasted steel plate (150 mm<length>×70 mm<width>×1.6 mm<thickness>), an epoxy anticorrosive coating material (epoxy AC coating material, product name: "BANNOH 500" produced by CHUGOKU MARINE PAINTS, LTD.) was applied so as to have a dry film thickness of approximately 100 μm, and after 1-day drying, an epoxy binder coating material (product name: "BANNOH 500N" produced by CHUGOKU MARINE PAINTS, LTD.) was applied thereon so as to have a dry film thickness of approximately 100 μm, and this was dried for 1 day. Further thereon, the antifouling coating compositions obtained in the above Examples or Comparative Examples were each applied so as to have a dry film thickness of approximately 400 μm, and these were dried under conditions at a temperature of 25° C. for 7 days to prepare an antifouling test plate.

The antifouling test plate prepared above was immersed in a seawater immersion vessel maintained at a temperature of 25° C. for 6 months while exchanging the seawater every week, and the plate was thereafter removed from the immersion vessel and was dried for 7 days.

In accordance with a method conforming to JIS K 5600-5-3:1999, 6. DuPont method, a 300 g weight was dropped from a drop height of 20 cm onto the dried test plate and damage on the coating film surface was visually evaluated based on the [Evaluation criteria for damage resistance] below. The results are summarized in Table 3.

[Evaluation Criteria for Damage Resistance]

5: No cracks or peeling occurred on the coating film surface.
   4: The length of peeling from the center of the dropped weight on the coating film surface was less than 10 mm on average.
   3: The length was 10 mm or greater and less than 20 mm on average.
   2: The length was 20 mm or greater and less than 30 mm on average.
   1: The length was 30 mm or greater on average.

<Binder Repairability Test>

Onto a sand-blasted steel plate (300 mm<length>×100 mm<width>×2.3 mm<thickness>), an epoxy anticorrosive coating material (epoxy AC coating material, product name: "BANNOH 500" produced by CHUGOKU MARINE PAINTS, LTD.) was applied so as to have a dry film thickness of approximately 100 μm, and after 1-day drying, an epoxy binder coating material (product name: "BANNOH 500N" produced by CHUGOKU MARINE PAINTS, LTD.) was applied thereon so as to have a dry film thickness of approximately 100 μm, and this was dried for 1 day. Further thereon, the antifouling coating compositions obtained in the above Examples or Comparative Examples were each applied so as to have a dry film thickness of approximately 400 μm, and these were dried under conditions at a temperature of 25° C. for 7 days to prepare an antifouling test plate.

In Hiroshima Bay, the antifouling test plate prepared above was immersed to a position approximately 1 meter below the water surface for 6 months. Thereafter, the surface of the test plate was washed with high-pressure water using a nozzle under a water pressure of 10 MPa, maintaining a distance of 1 m from the tip of the nozzle to the test plate, and this was then dried for 7 days. Onto the dried coating film, the binder coating material 1 (a composition obtained by mixing a base component and a curing component) having a composition shown in Table 4 was applied so as to have a dry film thickness of approximately 100 μm, and this was dried for 1 day. Further, the same compositions as the antifouling coating compositions obtained in the Examples or Comparative Examples having been used in the preparation of the above antifouling test plates were each applied so as to have a dry film thickness of approximately 400 μm, and these were dried for 7 days. The obtained steel plate with a coating film was immersed in a seawater immersion vessel maintained at a temperature of 25° C. for 3 months while exchanging the seawater every week. Thereafter, in accordance with a method conforming to JIS K 5600-5-6:1999, the surface of the coating film was cut at intervals of 4 mm to the depth reaching the antifouling coating film that had been initially applied onto the steel plate, and evaluation was performed based on the [Evaluation criteria for binder repairability] Below. The results are summarized in table 3.

[Evaluation Criteria for Binder Repairability]

5: In the grid pattern formed by cutting, the area in which peeling occurred is less than 1% of the whole area (hereinafter referred to as "the whole") of the grid pattern.

4: The area in which peeling occurred is 1% or greater and less than 10% of the whole.

3: The area in which peeling occurred is 10% or greater and less than 30% of the whole.

2: The area in which peeling occurred is 30% or greater and less than 70% of the whole.

1: The area in which peeling occurred is 70% or greater of the whole.

TABLE 3

|  |  |  | Examples | | | | |
| --- | --- | --- | --- | --- | --- | --- | --- |
|  |  |  | 1 | 2 | 3 | 4 | 5 |
| Blending amount (parts by mass) | (A) | A-1 | 45.0 | | | | |
|  |  | A-2 | | 45.0 | | | |
|  |  | A-3 | | | 45.0 | | |
|  |  | A-4 | | | | 45.0 | |
|  |  | A-5 | | | | | 40.0 |
|  |  | A-6 | | | | | |
|  |  | A-7 | | | | | |
|  |  | A-8 | | | | | |
|  | (J) | A-9 | | | | | |
|  |  | A-10 | | | | | |
|  | (B) | Zinc oxide | 25.0 | 25.0 | 25.0 | 25.0 | 25.0 |
|  | (C) | Copper pyrithione | 5.0 | 5.0 | 5.0 | 5.0 | 5.0 |
|  |  | Medetomidine | 0.1 | 0.1 | 0.1 | 0.1 | 0.1 |
|  | (D) | Zinc phosphate | 5.0 | 5.0 | 5.0 | 5.0 | 5.0 |
|  |  | Red iron oxide | 5.0 | 5.0 | 5.0 | 5.0 | 5.0 |
|  |  | Calcium sulfate | 0.5 | 0.5 | 0.5 | 0.5 | 0.5 |
|  |  | Talc | 3.0 | 3.0 | 3.0 | 3.0 | 3.0 |
|  | (E) | Versatic acid | 1.0 | 1.0 | 1.0 | 1.0 | 1.0 |
|  | (F) | BYK-066N | 0.1 | 0.1 | 0.1 | 0.1 | 0.1 |
|  | (G) | Xylene | 6.4 | 6.4 | 6.4 | 6.4 | 11.4 |
|  |  | PGM | 1.9 | 1.9 | 1.9 | 1.9 | 1.9 |
|  | (H) | Aliphatic acid amide | 1.5 | 1.5 | 1.5 | 1.5 | 1.5 |
|  |  | Oxidized polyethylene | 0.5 | 0.5 | 0.5 | 0.5 | 0.5 |
|  |  | Total (parts by mass) | 100.0 | 100.0 | 100.0 | 100.0 | 100.0 |
|  |  | (B)/(A) (%) | 115 | 114 | 115 | 115 | 115 |
|  |  | Coating material solids (% by mass) | 67 | 67 | 67 | 67 | 67 |
|  |  | Acid value of solvent-soluble content (mgKOH/g) | 83 | 81 | 85 | 59 | 80 |
|  |  | Coating material viscosity (KU) | 77 | 78 | 75 | 68 | 73 |
| Results |  | Antifouling properties (dynamic, 6 months) | 5 | 5 | 5 | 4 | 4 |
|  |  | Antifouling properties (dynamic, 12 months) | 5 | 4 | 3 | 4 | 3 |
|  |  | Coating film consumption degree (μm) | 5.2 | 4.0 | 3.2 | 3.0 | 1.7 |
|  |  | Damage resistance | 4 | 4 | 4 | 4 | 4 |
|  |  | Binder repairability | 4 | 4 | 4 | 4 | 4 |

|  |  |  | Examples | | | Comparative Examples | |
| --- | --- | --- | --- | --- | --- | --- | --- |
|  |  |  | 6 | 7 | 8 | 1 | 2 |
| Blending amount (parts by mass) | (A) | A-1 | | | | | |
|  |  | A-2 | | | | | |
|  |  | A-3 | | | | | |
|  |  | A-4 | | | | | |
|  |  | A-5 | | | | | |
|  |  | A-6 | 40.0 | | | | |
|  |  | A-7 | | 40.0 | | | |
|  |  | A-8 | | | 45.0 | | |
|  | (J) | A-9 | | | | 45.0 | |
|  |  | A-10 | | | | | 45.0 |
|  | (B) | Zinc oxide | 25.0 | 25.0 | 25.0 | 25.0 | 25.0 |

TABLE 3-continued

| | | | | | | |
|---|---|---|---|---|---|---|
| | (C) | Copper pyrithione | 5.0 | 5.0 | 5.0 | 5.0 | 5.0 |
| | | Medetomidine | 0.1 | 0.1 | 0.1 | 0.1 | 0.1 |
| | (D) | Zinc phosphate | 5.0 | 5.0 | 5.0 | 5.0 | 5.0 |
| | | Red iron oxide | 5.0 | 5.0 | 5.0 | 5.0 | 5.0 |
| | | Calcium sulfate | 0.5 | 0.5 | 0.5 | 0.5 | 0.5 |
| | | Talc | 3.0 | 3.0 | 3.0 | 3.0 | 3.0 |
| | (E) | Versatic acid | 1.0 | 1.0 | 1.0 | 1.0 | 1.0 |
| | (F) | BYK-066N | 0.1 | 0.1 | 0.1 | 0.1 | 0.1 |
| | (G) | Xylene | 11.4 | 11.4 | 6.4 | 6.4 | 6.4 |
| | | PGM | 1.9 | 1.9 | 1.9 | 1.9 | 1.9 |
| | (H) | Aliphatic acid amide | 1.5 | 1.5 | 1.5 | 1.5 | 1.5 |
| | | Oxidized polyethylene | 0.5 | 0.5 | 0.5 | 0.5 | 0.5 |
| | | Total (parts by mass) | 100.0 | 100.0 | 100.0 | 100.0 | 100.0 |
| | | (B)/(A) (%) | 114 | 114 | 113 | 114 | 149 |
| | | Coating material solids (% by mass) | 67 | 67 | 67 | 67 | 62 |
| | | Acid value of solvent-soluble content (mgKOH/g) | 88 | 86 | 70 | 83 | 92 |
| | | Coating material viscosity (KU) | 78 | 63 | 68 | 70 | 102 |
| Results | | Antifouling properties (dynamic, 6 months) | 4 | 5 | 4 | 4 | 5 |
| | | Antifouling properties (dynamic, 12 months) | 4 | 4 | 4 | 4 | 4 |
| | | Coating film consumption degree (μm) | 2.1 | 4.3 | 3.6 | 4.0 | 11.3 |
| | | Damage resistance | 4 | 4 | 4 | 1 | 2 |
| | | Binder repairability | 4 | 4 | 4 | 2 | 3 |

TABLE 4

| | Product name | Details | Blending amount (parts by mass) |
|---|---|---|---|
| Base components | jER 834-90X | Bisphenol A type epoxy resin, produced by Mitsubishi Chemical Corporation | 18.9 |
| | Laroflex MP-25 | Vinyl chloride/vinylisobutylether copolymer, produced by Mitsubishi Chemical Corporation | 3 |
| | TCP | Tricresyl phosphate, produced by Kyowa Kirin Co., Ltd. | 3 |
| | TTK Talc | Talc, produced by Takehara Chemical Industrial Co., Ltd. | 30 |
| | Aluminum paste 0638-70C | produced by Toyo Aluminum K.K. | 7 |
| | TITONE R-5N | produced by Sakai Chemical Industry Co., Ltd. | 1.9 |
| | Mitsubishi Carbon black MA100 | produced by Mitsubishi Chemical Corporation | 0.1 |
| | DISPARLON 6650 | Amide wax, produced by Kusumoto Chemicals, Ltd. | 1.5 |
| | Xylene | — | 15.6 |
| | 2-methoxypropanol | — | 2 |
| | Methylisobutylketone | — | 2 |
| Curing components | Lackamide TD966 | Polyamide amine, active hydrogen equivalent: 380 g/eq, produced by DIC Corporation | 10.5 |
| | TAP | 2,4,6-tris(dimethylaminomethyl)phenol, produced by Kayaku Akzo K.K. | 0.3 |
| | Xylene | — | 4.2 |

Examples 2 and 9 to 16 and Comparative Examples 3 and 4

Antifouling coating compositions were prepared by mixing and stirring the components in the blending amounts (parts by mass) described in Table 5. The blending amounts of the components described in Table 5 are in its present state.

Using the prepared antifouling coating compositions, the acid value of a solvent-soluble content and coating material viscosity were measured in the same manner as described above, and antifouling properties (dynamic, 6 months), coating film consumption degree, damage resistance, and binder repairability were evaluated. The results are summarized in Table 5.

With respect to the antifouling properties shown in Table 5, the test plate was immersed in a static state without the rotation as described above, in a position approximately 1 meter below the water surface in Hiroshima Bay, and the adhesion area of aquatic organisms on the antifouling coating film was measured 6 months (static, 6 months) and 12 months (static, 12 months) after the start of the immersion. The antifouling properties of the antifouling coating film were also evaluated in accordance with the [Evaluation criteria for antifouling properties by referring to adhesion area of aquatic organisms] above. The results are summarized in Table 5.

TABLE 5

|  |  |  | Examples |  |  |  |  |
|---|---|---|---|---|---|---|---|
|  |  |  | 2 | 9 | 10 | 11 | 12 |
| Blending amount (parts by mass) | (A) | A-2 | 45.0 | 35.0 | 50.0 | 45.0 | 35.0 |
|  | (B) | Zinc oxide | 25.0 | 30.0 | 20.0 | 25.0 | 15.0 |
|  | (C) | Cuprous oxide |  |  |  |  | 25.0 |
|  |  | Copper pyrithione | 5.0 | 5.0 | 5.0 | 5.0 | 3.0 |
|  |  | Zinc pyrithione |  |  |  |  |  |
|  |  | Medetomidine | 0.1 | 0.1 | 0.1 | 0.1 | 0.1 |
|  |  | Tralopyril |  |  |  |  |  |
|  | (D) | Zinc phosphate | 5.0 | 5.0 | 5.0 |  |  |
|  |  | Red iron oxide | 5.0 | 5.0 | 5.0 | 5.0 | 2.0 |
|  |  | Calcium sulfate | 0.5 | 0.5 | 0.5 | 0.5 | 0.5 |
|  |  | Barium sulfate |  |  |  | 5.0 | 5.0 |
|  |  | Talc | 3.0 | 3.0 | 3.0 | 3.0 | 3.0 |
|  | (E) | Versatic acid | 1.0 | 1.0 | 1.0 | 1.0 | 1.0 |
|  |  | Rosin |  |  |  |  |  |
|  | (F) | BYK-066N | 0.1 | 0.1 | 0.1 | 0.1 | 0.1 |
|  | (G) | Xylene | 6.4 | 11.4 | 6.4 | 6.4 | 6.4 |
|  |  | PGM | 1.9 | 1.9 | 1.9 | 1.9 | 1.9 |
|  | (H) | Aliphatic acid amide | 1.5 | 1.5 | 1.5 | 1.5 | 1.5 |
|  |  | Oxidized polyethylene | 0.5 | 0.5 | 0.5 | 0.5 | 0.5 |
|  |  | Total (parts by mass) | 100.0 | 100.0 | 100.0 | 100.0 | 100.0 |
|  |  | (B)/(A) (%) | 114 | 176 | 82 | 114 | 88 |
|  |  | Coating material solids (% by mass) | 67 | 67 | 64 | 67 | 72 |
|  |  | Acid value of solvent-soluble content (mgKOH/g) | 81 | 84 | 80 | 84 | 86 |
|  |  | Coating material viscosity (KU) | 78 | 70 | 74 | 79 | 73 |
| Results | Antifouling properties | Static, 6 months | 4 | 5 | 3 | 4 | 5 |
|  |  | Static, 12 months | 4 | 5 | 3 | 3 | 4 |
|  |  | Dynamic, 6 months | 5 | 3 | 5 | 4 | 3 |
|  |  | Coating film consumption degree (μm) | 4.0 | 3.3 | 5.8 | 3.5 | 2.9 |
|  |  | Damage resistance | 4 | 4 | 4 | 4 | 5 |
|  |  | Binder repairability | 4 | 4 | 4 | 4 | 5 |

|  |  |  | Examples |  |  |  |
|---|---|---|---|---|---|---|
|  |  |  | 13 | 14 | 15 | 16 |
| Blending amount (parts by mass) | (A) | A-2 | 35.0 | 45.0 | 45.0 | 45.0 |
|  | (B) | Zinc oxide | 20.0 | 25.0 | 25.0 | 25.0 |
|  | (C) | Cuprous oxide | 15.0 |  |  |  |
|  |  | Copper pyrithione | 3.0 |  |  | 5.0 |
|  |  | Zinc pyrithione |  | 5.0 | 5.0 |  |
|  |  | Medetomidine | 0.1 | 0.1 |  | 0.1 |
|  |  | Tralopyril |  |  | 3.0 |  |
|  | (D) | Zinc phosphate |  | 5.0 | 5.0 | 5.0 |
|  |  | Red iron oxide | 2.0 | 5.0 | 2.0 | 5.0 |
|  |  | Calcium sulfate | 0.5 | 0.5 | 0.5 | 0.5 |
|  |  | Barium sulfate | 5.0 |  |  |  |
|  |  | Talc | 3.0 | 3.0 | 3.0 | 3.0 |
|  | (E) | Versatic acid | 1.0 | 1.0 | 1.0 |  |
|  |  | Rosin |  |  |  | 1.0 |
|  | (E) | BYK-066N | 0.1 | 0.1 | 0.1 | 0.1 |
|  | (G) | Xylene | 11.4 | 6.4 | 6.5 | 6.4 |
|  |  | PGM | 1.9 | 1.9 | 1.9 | 1.9 |
|  | (H) | Aliphatic acid amide | 1.5 | 1.5 | 1.5 | 1.5 |
|  |  | Oxidized polyethylene | 0.5 | 0.5 | 0.5 | 0.5 |
|  |  | Total (parts by mass) | 100.0 | 100.0 | 100.0 | 100.0 |
|  |  | (B)/(A) (%) | 117 | 114 | 114 | 114 |
|  |  | Coating material solids (% by mass) | 67 | 67 | 67 | 67 |
|  |  | Acid value of solvent-soluble content (mgKOH/g) | 87 | 80 | 68 | 73 |
|  |  | Coating material viscosity (KU) | 65 | 74 | 72 | 77 |
| Results | Antifouling properties | Static, 6 months | 5 | 4 | 5 | 5 |
|  |  | Static, 12 months | 4 | 3 | 4 | 4 |
|  |  | Dynamic, 6 months | 4 | 5 | 4 | 4 |
|  |  | Coating film consumption degree (μm) | 3.2 | 5.6 | 5.3 | 5.8 |
|  |  | Damage resistance | 5 | 5 | 4 | 4 |

TABLE 5-continued

|  |  |  | Comparative Examples | |
|---|---|---|---|---|
|  |  | Binder repairability | 4  4  4  4 | |
|  |  |  | 3 | 4 |
| Blending amount (parts by mass) | (A) | A-2 | 45.0 | 30.0 |
|  | (B) | Zinc oxide | 15.0 | 30.0 |
|  | (C) | Cuprous oxide |  |  |
|  |  | Copper pyrithione | 5.0 | 5.0 |
|  |  | Zinc pyrithione |  |  |
|  |  | Medetomidine | 0.1 | 0.1 |
|  |  | Tralopyril |  |  |
|  | (D) | Zinc phosphate | 5.0 | 5.0 |
|  |  | Red iron oxide | 5.0 | 5.0 |
|  |  | Calcium sulfate | 0.5 | 0.5 |
|  |  | Barium sulfate | 10.0 |  |
|  |  | Talc | 3.0 | 3.0 |
|  | (E) | Versatic acid | 1.0 | 1.0 |
|  |  | Rosin |  |  |
|  | (E) | BYK-066N | 0.1 | 0.1 |
|  | (G) | Xylene | 6.4 | 16.4 |
|  |  | PGM | 1.9 | 1.9 |
|  | (H) | Aliphatic acid amide | 1.5 | 1.5 |
|  |  | Oxidized polyethylene | 0.5 | 0.5 |
|  |  | Total (parts by mass) | 100.0 | 100.0 |
|  |  | (B)/(A) (%) | 68 | 205 |
|  |  | Coating material solids (% by mass) | 67 | 65 |
|  |  | Acid value of solvent-soluble content (mgKOH/g) | 82 | 89 |
|  |  | Coating material viscosity (KU) | 73 | 63 |
| Results | Antifouling properties | Static, 6 months | 4 | 3 |
|  |  | Static, 12 months | 3 | 2 |
|  |  | Dynamic, 6 months | 3 | 2 |
|  |  | Coating film consumption degree (μm) | 7.2 | 2.7 |
|  |  | Damage resistance | 3 | 2 |
|  |  | Binder repairability | 3 | 3 |

Examples 4, 17, and 18

Antifouling coating compositions were prepared by mixing and stirring the components in the blending amounts (parts by mass) described in Table 6. The blending amounts of the components described in Table 6 are in its present state.

Using the prepared antifouling coating compositions, the acid value of a solvent-soluble content and coating material viscosity were measured in the same manner as described above, and antifouling properties (static, 6 months; dynamic, 6 months; and dynamic, 12 months), coating film consumption degree, damage resistance, and binder repairability were evaluated. The results are summarized in Table 6.

TABLE 6

|  |  |  | Examples | | |
|---|---|---|---|---|---|
|  |  |  | 4 | 17 | 18 |
| Blending amount (parts by mass) | (A) | A-4 | 45.0 | 35.0 | 50.0 |
|  | (B) | Zinc oxide | 25.0 | 30.0 | 20.0 |
|  | (C) | Copper pyrithione | 5.0 | 5.0 | 5.0 |
|  |  | Medetomidine | 0.1 | 0.1 | 0.1 |
|  | (D) | Zinc phosphate | 5.0 | 5.0 | 5.0 |
|  |  | Red iron oxide | 5.0 | 5.0 | 5.0 |
|  |  | Calcium sulfate | 0.5 | 0.5 | 0.5 |
|  |  | Talc | 3.0 | 3.0 | 3.0 |
|  | (E) | Versatic acid | 1.0 | 1.0 | 1.0 |
|  | (F) | BYK-066N | 0.1 | 0.1 | 0.1 |
|  | (G) | Xylene | 6.4 | 11.4 | 6.4 |
|  |  | PGM | 1.9 | 1.9 | 1.9 |
| (H) |  | Aliphatic acid amide | 1.5 | 1.5 | 1.5 |
|  |  | Oxidized polyethylene | 0.5 | 0.5 | 0.5 |
|  |  | Total (parts by mass) | 100.0 | 100.0 | 100.0 |
|  |  | (B)/(A) (%) | 115 | 177 | 82 |
|  |  | Coating material solids (% by mass) | 67 | 67 | 64 |
|  |  | Acid value of solvent-soluble content (mgKOH/g) | 59 | 64 | 56 |
|  |  | Coating material viscosity (KU) | 68 | 65 | 65 |
| Results | Antifouling properties | Static, 6 months | 3 | 4 | 3 |
|  |  | Dynamic, 6 months | 4 | 3 | 4 |
|  |  | Dynamic, 12 months | 4 | 3 | 3 |
|  |  | Coating film consumption degree (μm) | 3.0 | 2.7 | 3.2 |
|  |  | Damage resistance | 4 | 4 | 4 |
|  |  | Binder repairability | 4 | 4 | 4 |

The antifouling coating film formed from the present composition is found to have good antifouling properties while having an appropriate coating film consumption degree, as well as good damage resistance. The antifouling coating film is found to have excellent adhesion to a repair coating material (a coating film formed from the coating material) even after use in water (i.e., after deterioration).

The invention claimed is:
1. An antifouling coating composition, comprising:
  a hydrolyzable copolymer (A) containing an organosiloxane block and a metal ester group, and zinc oxide (B);

wherein the copolymer (A) comprises:

5 to 25% by mass of a constituent unit derived from a metal ester group-containing monomer (a1);

5 to 15% by mass of a constituent unit derived from an organosiloxane block-containing monomer (a2) represented by formula (2); and a constituent unit derived from a monomer (a3) represented by formula (3); and a content of the zinc oxide (B) relative to 100 parts by mass of the content of the copolymer (A) is 70 to 200 parts by mass:

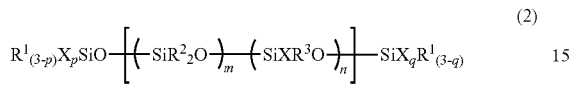
(2)

wherein $R^1$, $R^2$, and $R^3$ each independently represent a monovalent hydrocarbon group;

X each independently represent a (meth)acryloyloxyalkyl group or a mercaptoalkyl group;

m is 1 or greater;

n is 0 or greater;

p and q are each independently 0 or 1; and n+p+q is 1 or greater;

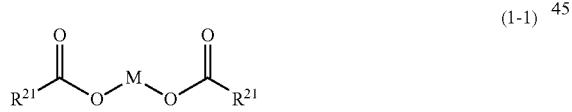
(3)

wherein $R^{41}$ represents a monovalent group including an ethylenically unsaturated group; and $R^{42}$ represents a monovalent hydrocarbon group with 3 to 6 carbon atoms being free of an ethylenically unsaturated group.

2. The antifouling coating composition according to claim 1, wherein the monomer (a1) comprises at least one monomer selected from the group consisting of monomers (a11) represented by formula (1-1) below and monomers (a12) represented by formula (1-2);

(1-1)

wherein $R^{21}$ each independently represent a monovalent group including a terminal ethylenically unsaturated group; and M represents a metal atom;

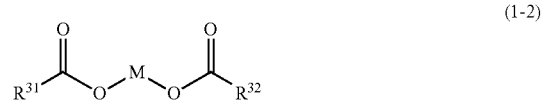
(1-2)

wherein $R^{31}$ represents a monovalent group including a terminal ethylenically unsaturated group;

$R^{32}$ represents a monovalent group with 1 to 30 carbon atoms being free of a terminal ethylenically unsaturated group; and M represents a metal atom.

3. The antifouling coating composition according to claim 1, wherein the monomer (a3) comprises a monomer represented by the formula (3) in which $R^{42}$ is a butyl group.

4. The antifouling coating composition according to claim 1, wherein the hydrolyzable copolymer (A) has a weight average molecular weight of 3,000 to 5,000.

5. The antifouling coating composition according to claim 1, wherein an acid value of a solvent-soluble content is 30 to 95 mgKOH/g.

6. An antifouling coating film formed from the antifouling coating composition according to claim 1.

7. A substrate with an antifouling coating film, having a substrate and the antifouling coating film according to claim 6.

8. A method for producing a substrate with an antifouling coating film, comprising:

providing the antifouling coating composition according to claim 1 on at least a part of a substrate; and drying the antifouling coating composition.

9. An antifouling method for a substrate, comprising:

forming the antifouling coating film according to claim 6 on at least a part of a substrate.

10. A method for repairing a substrate with an antifouling coating film, comprising:

applying a repair coating material onto the substrate with an antifouling coating film according to claim 7.

* * * * *